US007536287B2

(12) United States Patent
Chussil et al.

(10) Patent No.: US 7,536,287 B2
(45) Date of Patent: May 19, 2009

(54) SYSTEM AND METHOD OF INTERACTIVE SITUATION SIMULATION

(75) Inventors: Mark Chussil, Portland, OR (US); Christopher Hatzi, Tualatin, OR (US); Noam Ben-Ami, Seattle, WA (US); Adrian Cruz, Coral Gables, FL (US); Dennis Damore, Vancouver, WA (US)

(73) Assignee: Crisis Simulations International, Portland, OR (US)

( * ) Notice: Subject to any disclaimer, the term of this patent is extended or adjusted under 35 U.S.C. 154(b) by 136 days.

(21) Appl. No.: 11/531,732

(22) Filed: Sep. 14, 2006

(65) Prior Publication Data

US 2007/0129927 A1    Jun. 7, 2007

Related U.S. Application Data

(60) Provisional application No. 60/716,504, filed on Sep. 14, 2005.

(51) Int. Cl.
*G06G 7/48* (2006.01)
(52) U.S. Cl. .......................................... 703/6; 703/16
(58) Field of Classification Search .................. 703/6, 703/16; 434/107, 108, 169, 185
See application file for complete search history.

(56) References Cited

U.S. PATENT DOCUMENTS

| 5,689,233 | A | 11/1997 | Kurisu et al. |
| 5,815,417 | A | 9/1998 | Orr et al. |
| 5,954,517 | A | 9/1999 | Hagenlocher |
| 6,236,955 | B1 | 5/2001 | Summers |
| 6,379,253 | B1 | 4/2002 | Nishioka |
| 6,443,733 | B1 | 9/2002 | Stone |
| 6,763,325 | B1 | 7/2004 | Stone |
| 6,856,984 | B2 | 2/2005 | Slaikeu |
| 6,876,992 | B1 | 4/2005 | Sullivan |
| 6,876,993 | B2 | 4/2005 | Labutte et al. |
| 7,263,474 | B2 * | 8/2007 | Fables et al. .................. 703/6 |
| 2004/0023195 | A1 * | 2/2004 | Wen et al. .................. 434/185 |
| 2007/0105083 | A1 * | 5/2007 | Riener et al. ................ 434/273 |
| 2007/0136672 | A1 * | 6/2007 | Cooper ....................... 715/751 |

OTHER PUBLICATIONS

Notification of Transmittal of the International Search Report and the Written Opinion of the International Searching Authority, or the Declaration, dated Jul. 14, 2008.

(Continued)

*Primary Examiner*—Paul L Rodriguez
*Assistant Examiner*—Andre Pierre Louis

(57) ABSTRACT

An authoring, execution, and participation software system and corresponding method for the capture and execution of real-world events (e.g., crises) involving individuals such as senior private and/or public sector leaders is presented. The authoring system and method are used to model a scenario, incorporating knowledge from domain experts, relevant media, and external computation/simulation engines. The execution system and method execute scenarios created by the authoring system and method and provide a communication hub for the participation system and method. The participation system and method provide individuals, such as senior leaders and their staff, with appropriate views into the unfolding scenario and appropriate decisions to be made. The system and method also include features that allow for research and analysis with respect to, for example, efficient crisis response tactics.

16 Claims, 17 Drawing Sheets

OTHER PUBLICATIONS

SAR Technology: 'Incident Commander Pro' Program Overview [online], SAR Technology Inc., [Retrieved on Aug. 7, 2008] Retrieved from the Internet: <http://sartechnology.ca/sartechnology/ST_ProgramOverview.htm>.

IncidentCommander.com—BreakAway, Ltd. "Breaking New Ground for Gaming" Home Page [online] [Retreived on Aug. 7, 2008] Retrieved from the Internet: <http://www.incidentcommander.net>.

* cited by examiner

SYSTEM AND METHOD OF INTERACTIVE SITUATION SIMULATION

RELATED APPLICATION

The present application claims priority to U.S. Provisional Application No. 60/716,504 filed Sep. 14, 2005, the entirety of which is incorporated by reference.

FIELD OF THE INVENTION

The present invention generally relates to a system for and method of simulating situations. The present invention further relates to a system for and method of decision modeling and analysis.

BACKGROUND OF THE INVENTION

Prior art simulation systems tend to fall into three categories. The first category is paper and actor-based simulations, which use paper-based scripts and skilled facilitators who decide how participant behavior affects the simulation. These simulations are often run in a room with a staff of assistants who deliver paper messages. Like the first category, the second category also involves the use of scripts, but attempts to increase fidelity by involving often very large numbers of participants in-situ. These participants may be actors playing the part of injured civilians, military personnel, vehicles, and other entities all operating in the real world according to the simulation's script. These simulations tend to require many months of planning, are difficult to stage, hard to repeat, and often tremendously costly.

The third category involves computer-based simulation of real-world entities. In these systems, such as BCD Modelling's TUTOR, BreakAway, Ltd.'s Incident Commander, and Advanced Systems Technology's EPiCS, simulations are created by creating models of the real world in a computer. The systems include pre-built computational models. These existing simulations tend to be difficult to control and tend to focus exclusively on first-responders, such as police dispatchers. Such simulations generally fail to gauge the effectiveness of senior-level strategies, whose effects are often both profound and very subtle.

BRIEF DESCRIPTION OF THE DRAWINGS

The purpose and advantages of the present invention will be apparent to those of ordinary skill in the art from the following detailed description in conjunction with the appended drawings.

DETAILED DESCRIPTION OF THE INVENTION

Figure 1:
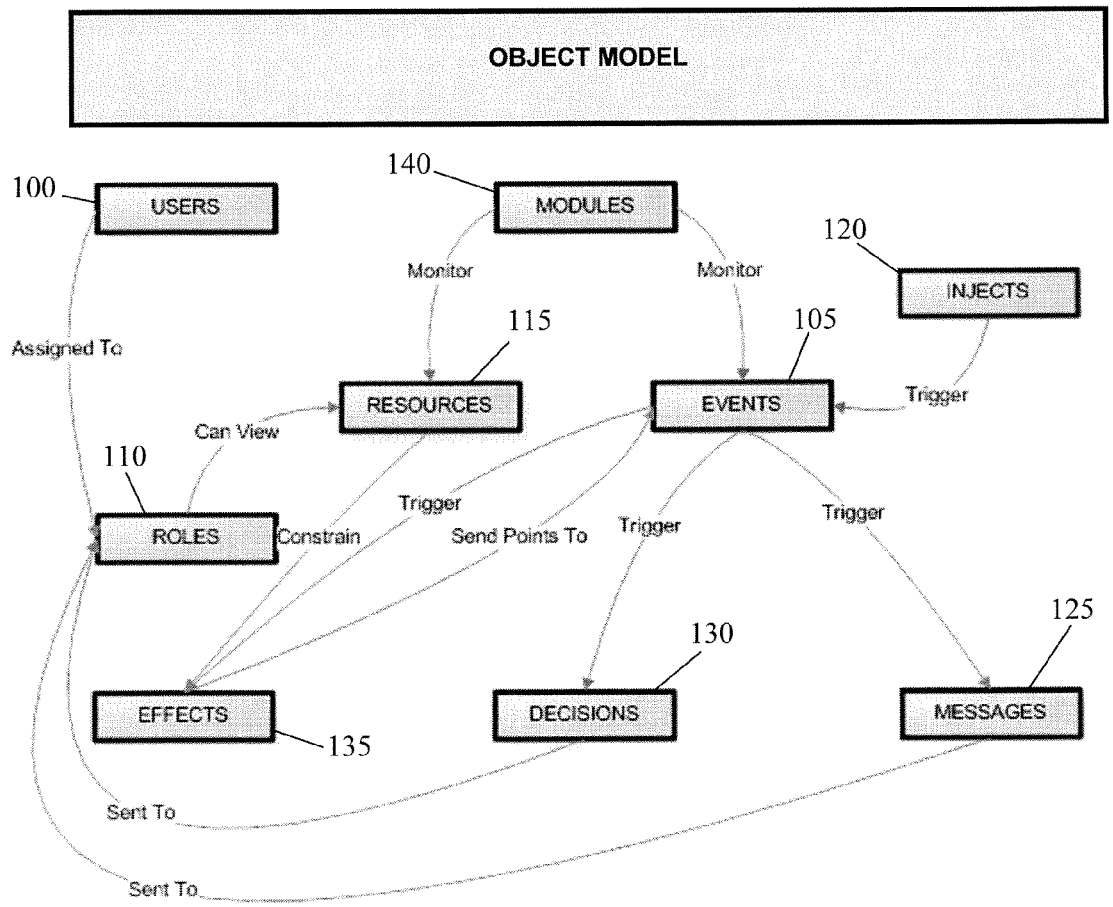
FIG. 1 is a schematic diagram depicting simulation objects and their relationships with each other according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

This disclosure presents an authoring, execution, participation, and analysis software system and corresponding method for the capture and execution of real-world events (e.g., crises) involving human being and/or automated participants. The authoring system and method, according to some embodiments, may be used to model a scenario, incorporating knowledge from domain experts, relevant media, and external computation/simulation engines. The execution system and method, according to some embodiments, execute scenarios created by the authoring system and method and provide a communication hub for the participation system and method. The participation system and method, according to some embodiments, provide individuals with appropriate views into the unfolding scenario and appropriate decisions to be made. Some embodiments also include features that allow for research and analysis with respect to, for example, efficient crisis response tactics.

Embodiments of the present invention generally include systems for and methods of modeling and executing decision models. Such embodiments are suitable for any kind of scenario or situation that may involve multiple parties making independent decisions leading to outcomes. Those situations may be crises or non-crises that require multiple people to work together to achieve a goal. Participants may work cooperatively, independently, or in competition. By way of non-limiting example, participants may include members of a city's emergency response team who work together, business owners who make decisions independent from city policymakers, and terrorists who adjust their actions to the city's actions.

Certain embodiments provide a rich environment for the participants. For example, simulation participants may make similar or different decisions. Decisions may offer choices, such choices may be "any or all" or "choose only one," and can time out if not made in a prescribed period of time. That is, a decision posed to a role may be taken away if not used within a given time. Decisions made by participants may be time-stamped. Different or similar messages may be sent to any combination of participants and/or operators. Messages, text, pictures, movies, or any other type of media that can be displayed in an internet browser, for example, may be used. The scenario events and decisions may be displayed in graphical or textual form. Other communication channels, such as pager or telephone, may be used. Certain embodiments greatly reduce the number of people required to run a simulation by using computers to deliver messages, coordinate media, act as automated participants, and synchronize all users.

Simulations according to certain embodiments of the present invention may be quite complex. For example, certain embodiments may use points to allow various combinations of events and/or decisions to trigger other events and decisions. Events may be introduced into the simulation based on any combination of time, operator control, participants' actions, and other events. When it is desired that a model include actual computation to determine effects and resource consumption, additional computational models can be brought in through the use of dynamically loaded external modules. In addition, realism and interaction may be added to a model by exposing certain events as decisions to particular player roles and adding media such as text, audio, and video which are routed to the appropriate user roles. Both decisions and media may be sent as a result of events triggering. Generic abstractions allow for simulation of diverse situations.

A visual authoring tool may be used to generate and rapidly deploy simulations. Such an authoring tool may provide a coherent, unified representation of captured knowledge from different domain experts. Use of the visual authoring tool also greatly simplifies the impact of making changes to simulation models, as the simulation engine automatically tracks the effects that connect various events. Cascading effects, effect loops and other structures may all be automatically executed and visually represented.

Embodiments of the present invention may have the following features. Add-in modules and models may be supported. For example, such modules may include support for calculating results of decisions such as casualties and economic consequences in real time. Embodiments may include resources capabilities, so that decisions and events are constrained based on resources available to the participants. Agents, i.e., software modules that role-play human decision makers, may be included as participants. Such agents may be set up so that human participants may experience agent pre-programmed personalities. Such agents also allow a single person to experience the simulation, perhaps multiple times. Embodiments of the present invention can send messages to participants via pagers, PDAs, cell or land-line phones, internet browser, VoIP, or any other devices so that participants may join the simulation without warning and wherever they are. Embodiments of the present invention construct a database of decisions during multiple runs of the simulation, suitable for analysis and research. Messages may be sent to simulation operators, who may be located anywhere, so that they may implement actions (e.g., have people at a site enact behavior for a camera crew with a closed-circuit TV feed to the simulation participants).

The Appendix includes exemplary pseudocode for an embodiment of the present invention.

FIG. 1 is a schematic diagram depicting simulation objects and some of their relationships with each other according to an embodiment of the present invention. The embodiment of FIG. 1 includes an authoring system used to define a scenario and its participants and an execution system that can execute a scenario by advancing it forward in time. The embodiment of FIG. 1 also includes a participation system capable of providing users with personalized views of the scenario. The system furthermore allows users to participate in the scenario by providing them with means to trigger certain events (e.g., input means such as a keyboard, mouse, telephone, personal digital assistant or voice activated controller). The participant system is connected to the execution system through a network connection and may be at an arbitrary geographic location removed from it.

A set of abstractions are included in the embodiment of FIG. 1. Such abstractions include, by way of non-limiting example, time, users 100, roles 110, resources 115, injects 120, events 105, messages 125, decisions, effects 135, modules 140, processes and agents. Exemplary abstractions are discussed presently.

Time allows the scenario to be started, paused, or stepped forward at any rate. The time abstraction also tracks the number of simulated seconds elapsed since the beginning of the simulation.

Users 100 allow participants to connect to the system and map real people to the roles they fulfill within the scenario. Users 100 are assigned a unique login, first/last name, and set of roles. For example, "Bob Smith" may log into the system as "bsmith" and is assigned the role of "Police Chief".

Roles 110 define the messages sent to particular users, which resources are visible to them, and what events they can trigger. Each role 110 is assigned a unique name.

Resources 115 models system constraints and are used to constrain/enable events. Resources 115 are assigned a unique name, initial quantity, and a set of roles 110 that can view their quantity. For example, the role 110 of "Fire Chief" may be allowed to see the quantity of "Fire Engines" while "FBI Agent in Charge" may be allowed to see the quantity of "FBI Agents."

Injects 120 are instructions to execute events 105 at a particular number of minutes after simulation start. For example "Bomb goes off on Bridge #17" may be injected fifteen minutes after simulation start.

Events 105 are the core abstraction and represent a change in the state of the simulation. Event 105 activity is measured by a scalar integer called "intensity." Events 105 generally start with an initial intensity of zero. Intensity reaching a value greater than or equal to a threshold (e.g., 100) will activate the decisions 130 and effects 135 associated with the event 105. Intensity may be measured and accounted for using points. Each event 105 is assigned a unique, descriptive name, such as "Bridge #17 collapses due to overheating." Events 105 contain any number of messages 125, decisions 130, and effects 135. Events can be time-limited or perpetual. Events may be configured to send a stream of points to other events.

Messages 125 include data sent to a set of roles 110 as the result of a particular Event 105 reaching a particular intensity. Messages 125 may be targeted to a particular participant system viewport (i.e., window or other display feature), which determines how their data is interpreted. Messages 125 sent to a text viewport will be read as simple text, those sent to a browser viewport will be read as URLs, etc. Embodiments of the present invention can send messages to participants via, by way of non-limiting example, pagers, PDAs, cell or land-line phones, internet browser, walkie-talkie, or VoIP. A given message may be sent to a single or multiple roles. Further, a Simulation Master may facilitate messaging via real items (e.g., books, phone messages, walkie-talkies) by, for example, providing such an item to the relevant participant in response to receiving a message to do so.

Decisions 130 may be activated by event 105 (e.g., the first time event 105 is triggered). Decisions 130 consist of a set of events which are targeted to a particular role. Decisions 130 can be single or multiple choice—indicating that the user 100 may select only one of the given choices or any number of them. For example, the event "A request for assistance has come in from the mayor" may trigger a single choice decision by "Governor" to "Grant Assistance to Mayor," "Deny Assistance to Mayor" or "Request More Information from Mayor." On the other hand, the event "Five Alarm Fire Declared in Downtown" may trigger the multiple choice decision to "Dispatch Additional Fire Engine," "Request Assistance from Nearest Town," "Request HazMat Analysis," and "Personally Drive to Fire Scene." Decisions may be sent to individual or multiple users.

Effects 135 represent the causal relationship between events 105. Effects 135 are executed when an event 105 triggers. Each effect 135 may send an initial number of points to the intensity value of a target event 105. It may then send a number of points to event 105 periodically for a pre-determined amount of time. By way of non-limiting example, effect 135 may send a number of points to event 105 once a minute for a number of minutes. Effect 135 execution can be connected to resources. For example, effect 135 execution may consume a quantity of a resource 115, with execution being canceled if a sufficient quantity is not available. Effect 135 execution may add a certain number to a resource 115. Or, effect 135 execution may require a certain quantity of resource 115 but not consume it. For example "Make Cell Phone Call" may require a quantity of "1" on resource "Cell Phone System".

Modules 140 enable the capabilities of the system to be expanded in arbitrary ways. Modules 140 are arbitrarily complex pieces of code bound to a simulation to add any functionality. Modules 140 can, for instance, calculate the number of dead and injured in a city, as a function of events and decisions in a simulation. Modules 140 are generally given a place to display their own custom interface within the server system's user interface. For example, modules 140 may send information to participants' screens via windows as described below in reference to FIGS. 6 and 7 and may access databases as needed. As another example, modules 140 may be configured to send messages to simulation participants by way of auxiliary communication channels, such as pagers, PDAs, cell or land-line phones, internet browsers, walkie-talkies, or VoIP. The interface between module 140 and simulation is simple and well-defined, so the consultant need not know anything about how module 140 works internally, and the consultant who generates module 140 need not know anything about how the simulation is laid out, except for the rules for passing information back and forth.

The technical functionality of modules 140 is at once complex and simple. Modules 104 are generally assigned a unique name and a path to a dynamically linked library containing classes that expose appropriate interfaces. Multiple instances of the same class may be loaded under different names. Modules can also be assigned bindings which provide an indirection that decouples generic modules from specific scenarios. These bindings allow exposed module variables to be assigned the quantity of a given resource 115 or the intensity of a particular event 105. In addition to this indirection, modules 140 may have full read/write access to all the objects in the simulation in which they are run. Modules 140 can query the status of the simulation at any given point in time. In addition, the simulation can maintain variables that modules 140 can read, which provide a way for the simulation to trigger behavior in the modules. Modules 140 can be bound to any number of simulations. Modules 140 can calculate the outcome(s) of a simulation, which can be saved, along with time-stamped decisions made during the simulation, to enable performance assessment and decision analysis.

It is important to note that FIG. 1 depicts only a portion of relationships that are available between different abstractions. Nearly any abstraction may have a relationship with and communicate information to nearly any other abstraction.

In general, abstractions may be implemented as, by way of non-limiting example, instances of serializable C# classes. Other implementations are also contemplated, such as objects in any object-oriented programming language. Objects generally contain a hashtable of properties. By way of non-limiting example, Event.Name may resolve to an entry in the event instance's hashtable. Hashtable keys may be implemented as strings that are typically the same as the property, e.g., Event.Name is held in the key called "Name." A custom collection class, "EntityContainer" based on a vector structure may be used to store collections of references, e.g., Simulation.Events, Decision.Choices, User.Roles, etc.

Classes may be derived from a common base-class called "Entity." Instances of EntityContainer work with instances of Entity to maintain a vector of all collections that reference a particular entity. Thus, an event may contain a vector of all containers that reference it. This may be used for automatic garbage collection during object deletion time. In other words, when Event.delete( ) is called, the base class' delete( ) method may ensure that the event instance is removed from all containers that reference it. The function event.delete( ) itself may be virtual.

Figure 2:
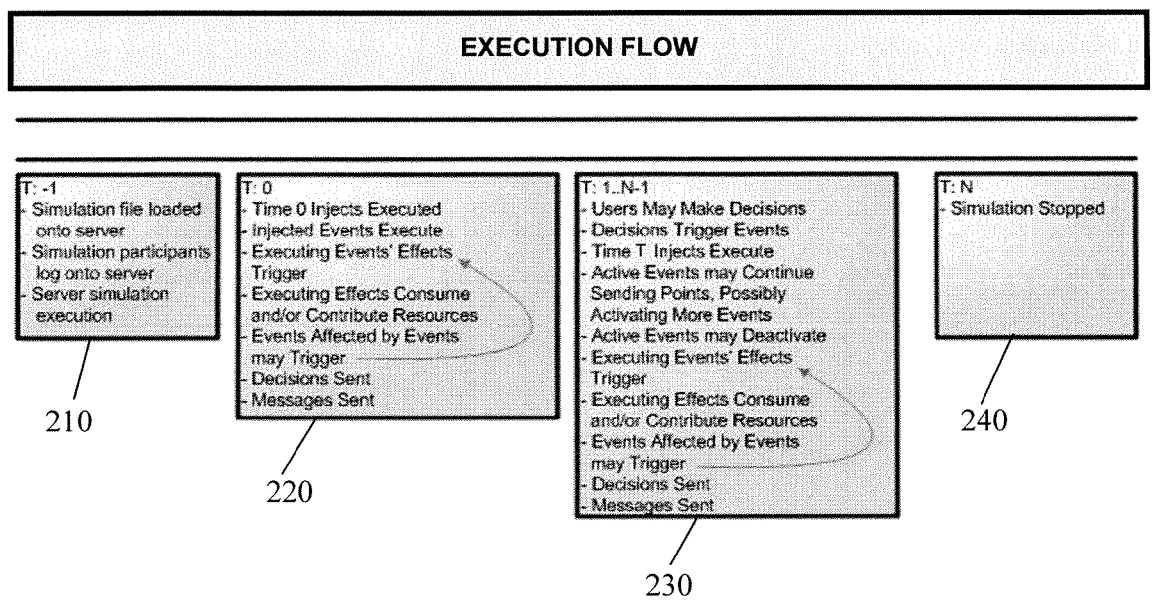
FIG. 2 is a schematic diagram depicting an exemplary execution policy for a running simulation according to an embodiment of the present invention.

FIG. 2 shows an exemplary execution policy flow for a running simulation according to an embodiment of the present invention. At time T=−1, (210) the simulation is loaded onto the server, the participants log onto the server, and the server begins the simulation execution. The server can log on clients (via the ActorClient software) dynamically and anonymously when users come online. At time T=0, (220) the time zero injects trigger, the T=0 injected events are activated, and the executing events' associated effects are triggered. Further, the effects executing at time T=0 (220) consume or contribute to their associated resources as programmed in the simulation. Also at T=0, (220) the appropriate decisions are sent to the appropriate roles as programmed in the simulation.

The main body of the simulation occurs at time T (230) for 0<T<N, where the simulation duration is N time units (typically simulation minutes). At that time, users may make appropriate decisions, which may trigger events, e.g., by way of effects. Time T injects execute. Those events that are currently executing may continue to send points as programmed by way of, e.g., effects. During the body of the simulation, events may deactivate or trigger effects. Further, executing effects may consume or contribute to resources. Throughout the simulation, roles receive messages and decisions.

At time T=N, (240) where the simulation is N time units long, the simulation concludes.

Figure 3:
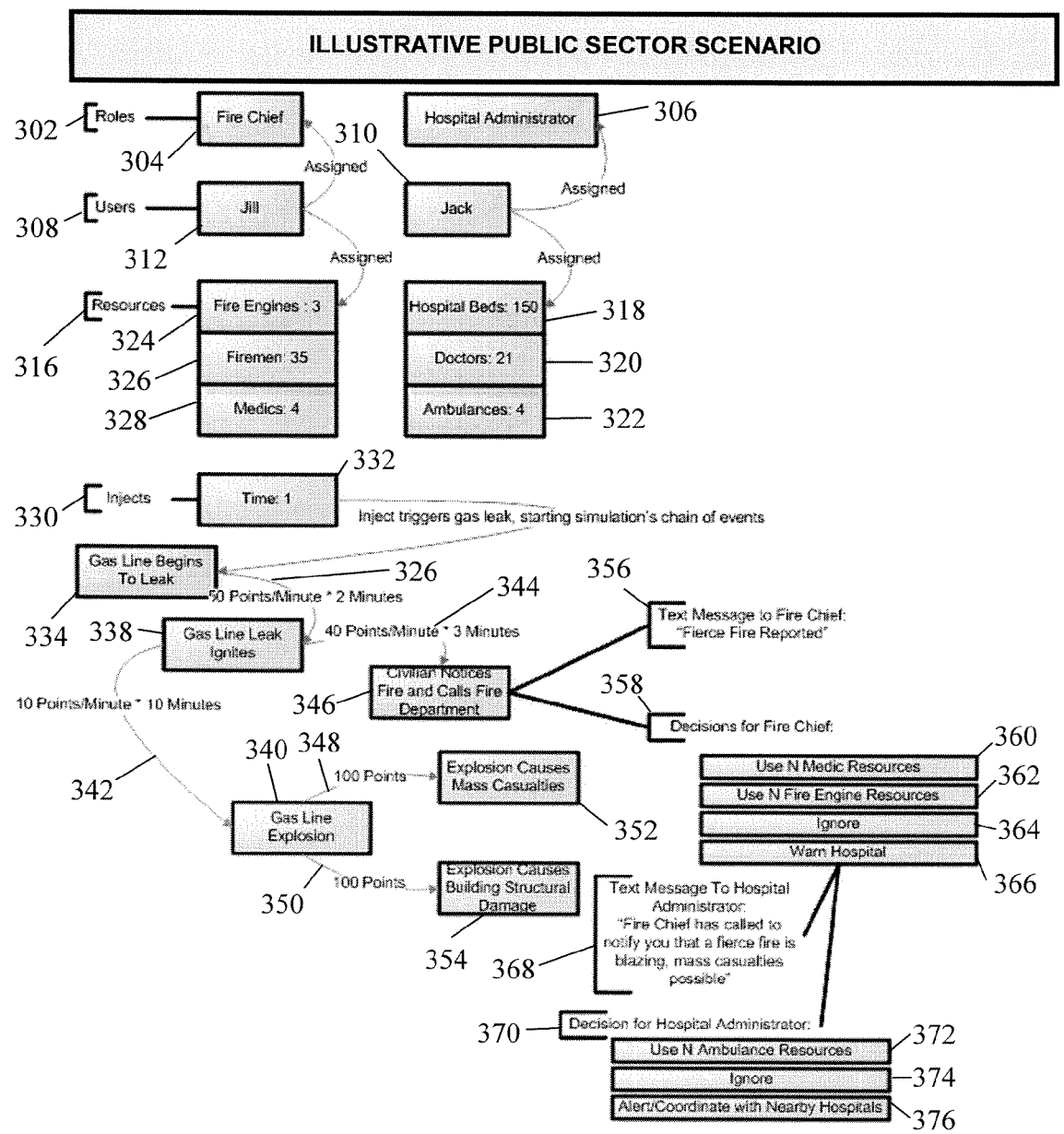
FIG. 3 is a schematic diagram depicting a portion of a public sector scenario according to an embodiment of the present invention.

FIG. 3 depicts a portion of an illustrative public sector scenario according to an embodiment of the present invention. FIG. 3 further depicts schematically instances of the classes shown in FIG. 1 according to this embodiment. In particular, FIG. 3 depicts roles 302 (e.g., fire chief 304 and hospital administrator 306) and users 308 (e.g., Jack 310 and Jill 312). Jack 310 is assigned the role of hospital administrator 306, while Jill 312 is assigned the role 302 of fire chief 304. Jack 310 is assigned resources 316, namely one-hundred-and-fifty hospital beds 318, twenty-one doctors 320, and four ambulances 322. Jill 312 is also assigned resources 316, namely three fire engines 324, thirty-five firemen 326, and four medics 328.

The scenario depicted in FIG. 3 is that of a gas line break. In this scenario, events activate upon receiving at least one hundred points. At time T=1 (332), an inject 330 causes a "gas line leak" event 334 to activate. "Gas line leak" event 334 triggers an effect 336, which sends 50 points per minute for two minutes to "gas leak ignites" event 338. "Gas leak ignites" event 338 triggers two effects: the first effect 342 sending ten points per minute for ten minutes to the event "gas line explosion" 340, and the second effect 344 sending forty points per minute for three minutes to the event "civilian notices and calls fire department" 346. "Gas line explosion" event 340 sends, by way of effects 348 and 350 respectively, one hundred points to each of the events "explosion causes mass casualties" 352 and "explosion causes building structural damage" 354. Event "civilian notices and calls fire department" 346 triggers a text message 356 to Jill 312 in the role 302 of fire chief 304 reading "fierce fire reported." This same event 354 sends a decision 358 to Jill 312 in the role 302 of Fire Chief 304 allowing her to choose from among: "use N medic resources" 360, "use N fire engine resources" 362, "ignore" 364, and "warn hospital" 366, from which Jill 312 may select one or more choices as well as values for N. If Jill 312 chooses "warn hospital" 366, Jack 310 in the role 302 of hospital administrator 306 receives a text message 368 reading "fire chief has called to notify you that a fierce fire is blazing, mass casualties possible." Hospital administrator 306 Jack 310 also receives a decision 370 with choices "use N ambulance resources" 372, "ignore" 374 and "alert/coordinate with nearby hospitals" 376.

Sending fire engines on time would reduce the risk of gas line explosion by sending negative points to the corresponding events. Sending medical resources would reduce the number of casualties in case of explosion, structural damage, or building collapse. Coordinating with nearby hospitals would provide more ambulances, further reducing casualties. According to this simulation, ignoring the crisis causes the situation to grow worse. Additional messages may involve, by way of non-limiting example, media videos, dispatch calls, and phone calls. The simulation according to FIG. 3 may contain red herrings, where events are false alarms, which may cause users to commit a resource to unnecessary action.

Figure 4:
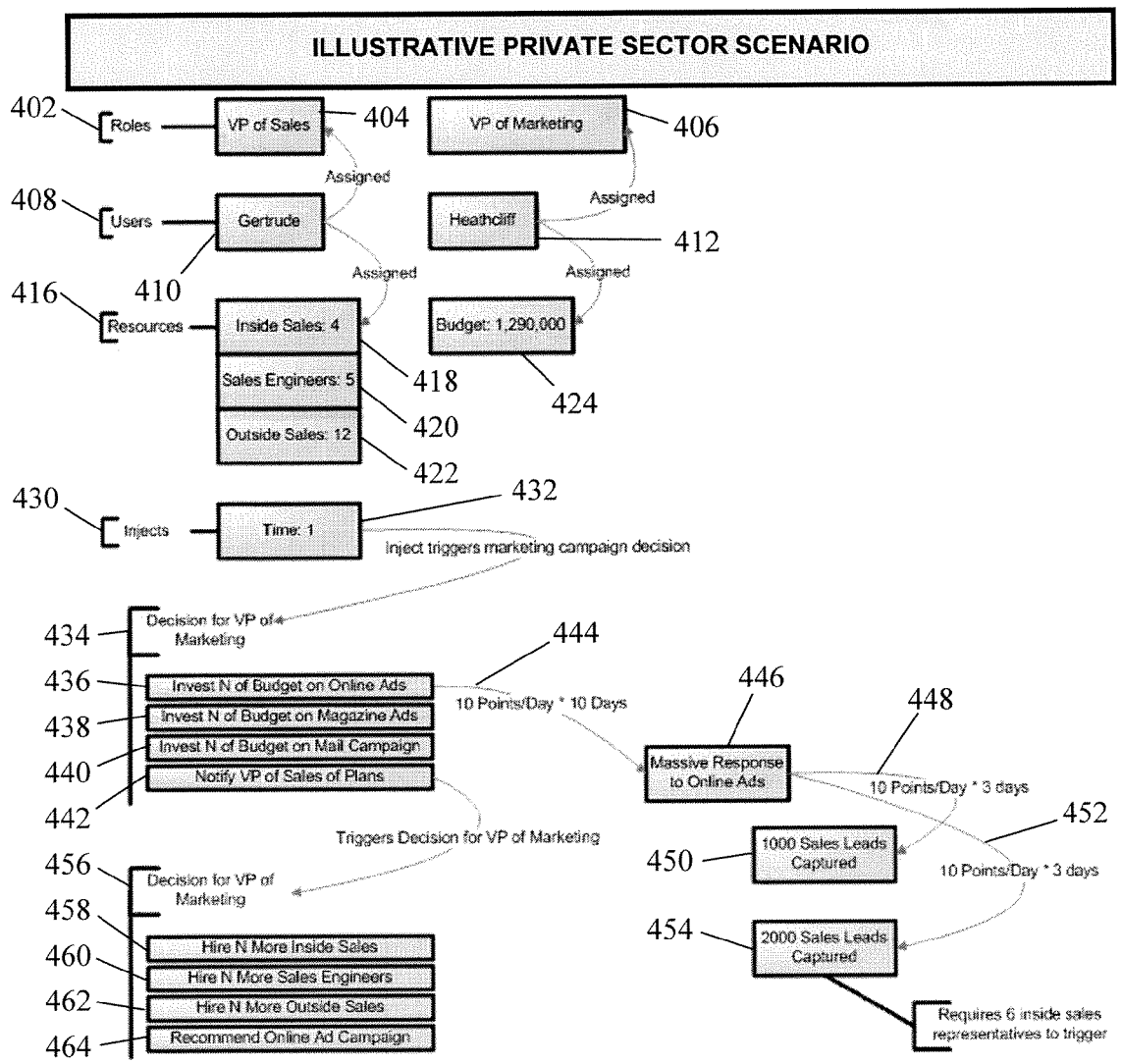
FIG. 4 is a schematic diagram depicting a portion of a private sector scenario according to an embodiment of the present invention.

FIG. 4 depicts a portion of an illustrative private sector scenario according to an embodiment of the present invention. FIG. 4 further schematically depicts instances of the classes shown in FIG. 1 according to this embodiment. In particular, FIG. 4 depicts roles 402 (e.g., vice-president of sales 404 and vice president of marketing 406) and users 408 (e.g., Gertrude 410 and Heathcliff 412). Gertrude 410 is assigned the role of vice president of sales 404, while Heathcliff 412 is assigned the role 402 of vice president of marketing 406. Gertrude 410 is assigned resources 416, namely four inside sales representatives 318, five sales engineers 420, and twelve outside sales representatives 422. Heathcliff 412 is also assigned a resource 416, namely a budget 424 of $1,290,000.

The scenario depicted in FIG. 4 is that of a set of marketing decisions. In this scenario, events activate upon receiving at least one hundred points. At time T=1 (432), an inject 430 causes a "marketing campaign" decision 434 to be sent to Heathcliff 412 in the role 402 of vice president of marketing 406. Heathcliff's choices are "invest N of budget on online advertisements" 436, "invest N of budget on magazine advertisements" 438, "invest N of budget on mail campaign" 440, and "notify vice president of sales of plans" 442. Heathcliff may select one or more values for N. If Heathcliff 412 in the role 402 of vice president of marketing 406 chooses "invest N of budget on online advertisements" 436, an effect 444 sends ten points per day for ten days to event "massive response to online advertisements" 446. Event "massive response to online advertisements" 446, in turn, triggers effect 448, which sends ten points per day for three days to event "one-thousand sales leads captured" 450. Event "massive response to online advertisements" 446 also triggers effect 452, which sends ten points per day for three days to event "two-thousand sales leads captured" 454. Effect "two-thousand sales leads captured" 454 requires one-hundred points as well as the presence of at least six inside sales representatives to trigger. If Heathcliff 412 chooses "notify vice president of sales of plans" 442, it triggers another decision 456 for Heathcliff 412 in the role 402 of vice-president of marketing 406. Decision 456 includes the choices "hire N more inside sales representatives" 458, "hire N more sales engineers" 460, "hire N more outside sales representatives" 462 and "recommend online advertisement campaign" 464. Decision 456 includes the ability to select values for N.

Appropriate communication between the marketing 406 and sales 404 departments would likely result in conformance with the best strategy, namely placing online advertisements 436 and hiring an appropriate number of sales representatives 458, 460 and 462. These expedients would allow handling the full number of sales leads. Additional features that are contemplated in the embodiment of FIG. 4 include scenario flow directed to outside sales and sales engineers and an accounting for increased sales leads as a function of increased expenditure. According to the embodiment of FIG. 4, hiring additional personnel but making wrong marketing choices would waste resources.

Figure 5:
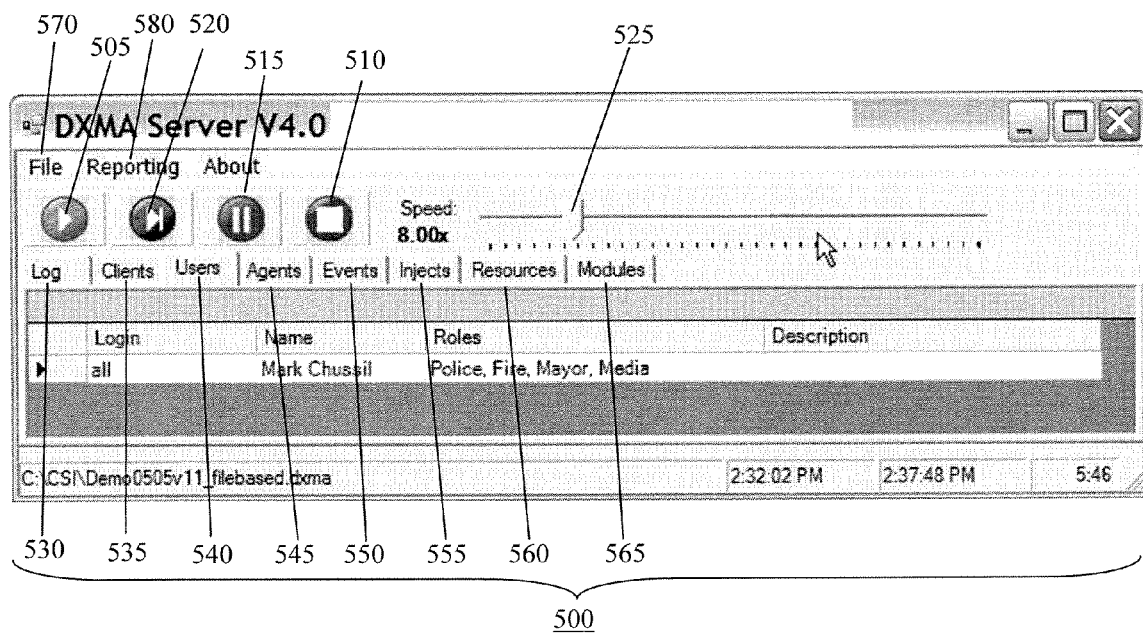
FIG. 5 is an illustration of a server window according to an embodiment of the present invention.

FIG. 5 is an illustration of a server window according to an embodiment of the present invention. Server window 500 is provided in a conventional software window. Server window 500 is configured to provide instant access to every feature of the simulation and its status. Server window 500 includes controls for starting 505, stopping 510 and pausing 515 the simulation. Server window 500 further includes a control 520 for skipping to the end of the simulation. Server window 500 may be used to speed up or slow down the speed of the simulation using speed control 525.

Server window 500 controls all aspects of a given simulation. For example, log tab 530 may be activated to view and edit a log of the active simulation. Client tab 535 may be activated to view and edit a list of clients and their status. Users tab 540 may be activated to view and edit a list of all users and their status, including their roles and whether they are logged in. Agent tab 545 may be activated to view and edit a list of all agents involved in the simulation and their properties. Event tab 550 may be used to reveal and edit all events and their properties that are present in the simulation. Injects tab 555 provides a summary of all injects in the simulation as well as their properties. Injects tab 555 may be used to edit the injects. Activating resources tab 560 will reveal a list of the simulation resources and their status, which may be edited. Modules tab 565 may be activated to reveal and edit the simulation modules and their properties. Each of the features indicated above as being editable may be edited at any time, including in real-time during a simulation.

Note that server window 500 further includes a file drop-down table 570 for loading and saving simulations. Server window 500 also includes a reporting drop-down table 580 for producing reports and analysis of the simulation.

Figure 6:
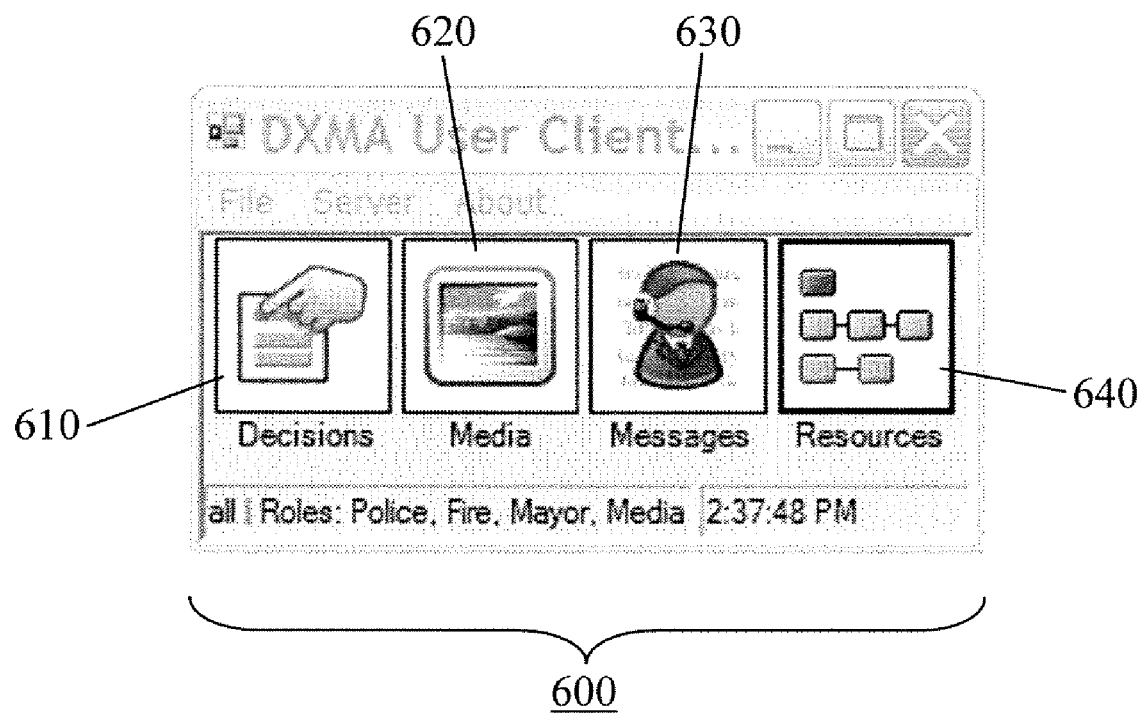
FIG. 6 is an illustration of a client window according to an embodiment of the present invention.

FIG. 6 is an illustration of a client window according to an embodiment of the present invention. Client window 600 includes buttons configured to allow a simulation user (i.e., participant) to call up information relevant to the simulation. In particular, client window 600 includes decision button 610, which, when activated, displays all decisions for that user. Activating media button 620 displays any media images (e.g., video, audio, tickertape, phone messages, pager messages, and text messages) that comprise part of the simulation. Activating messages button 630 causes the system to display the messages that are directed to that user. Resources button 640 is used to display resources that are viewable to the user. Such resources may be presented in bar-chart form or any other form and typically depict how much resource is available and how much has been consumed. By way of non-limiting example, each of these sets of information may be presented in a separate window, which may be a separate web browser window.

Figure 7:
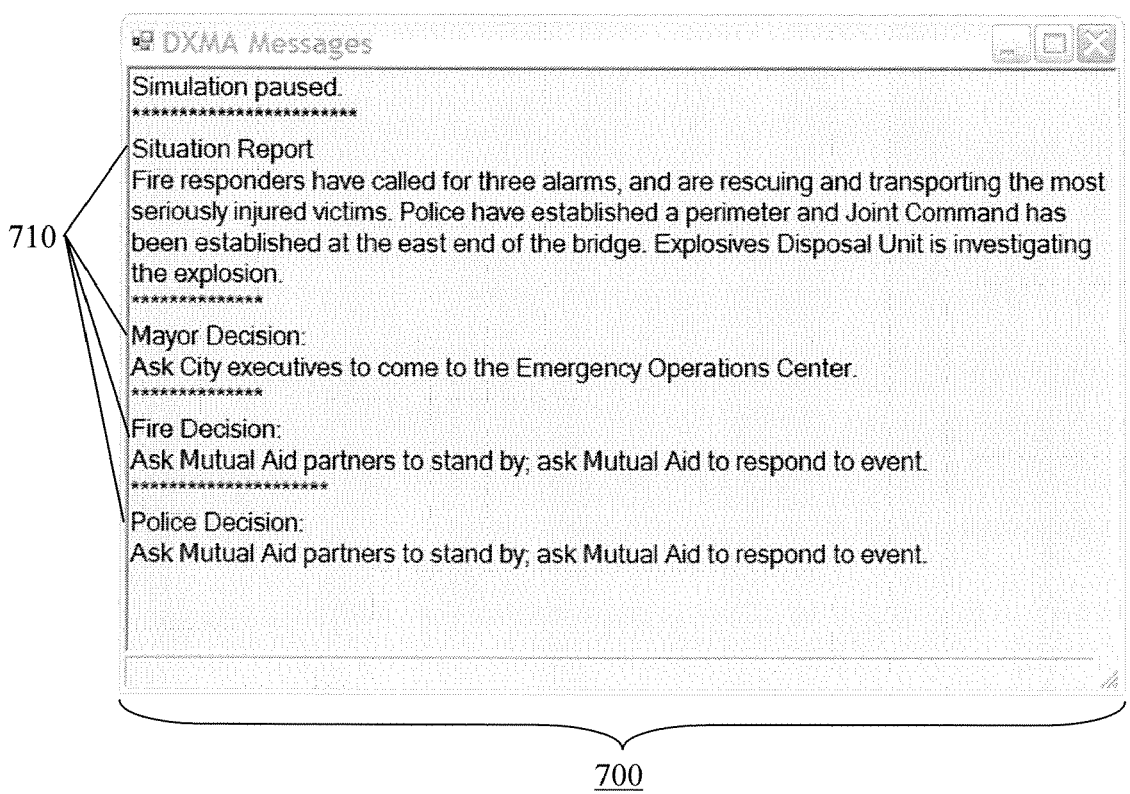
FIG. 7 is an illustration of a client message window according to an embodiment of the present invention.

FIG. 7 is an illustration of a client message window according to an embodiment of the present invention. Message window 700 displays all messages 710 to the associated user in the simulation. Such messages 710 may include the decision choices of the user and of other users participating in the simulation. Note that window 700 is but one example of a communication channel that may be used for messaging. Embodiments of the present invention can send messages to participants via, by way of non-limiting example, pagers, PDAs, cell or land-line phones, internet browser, walkie-talkie, or VoIP.

Figure 8:
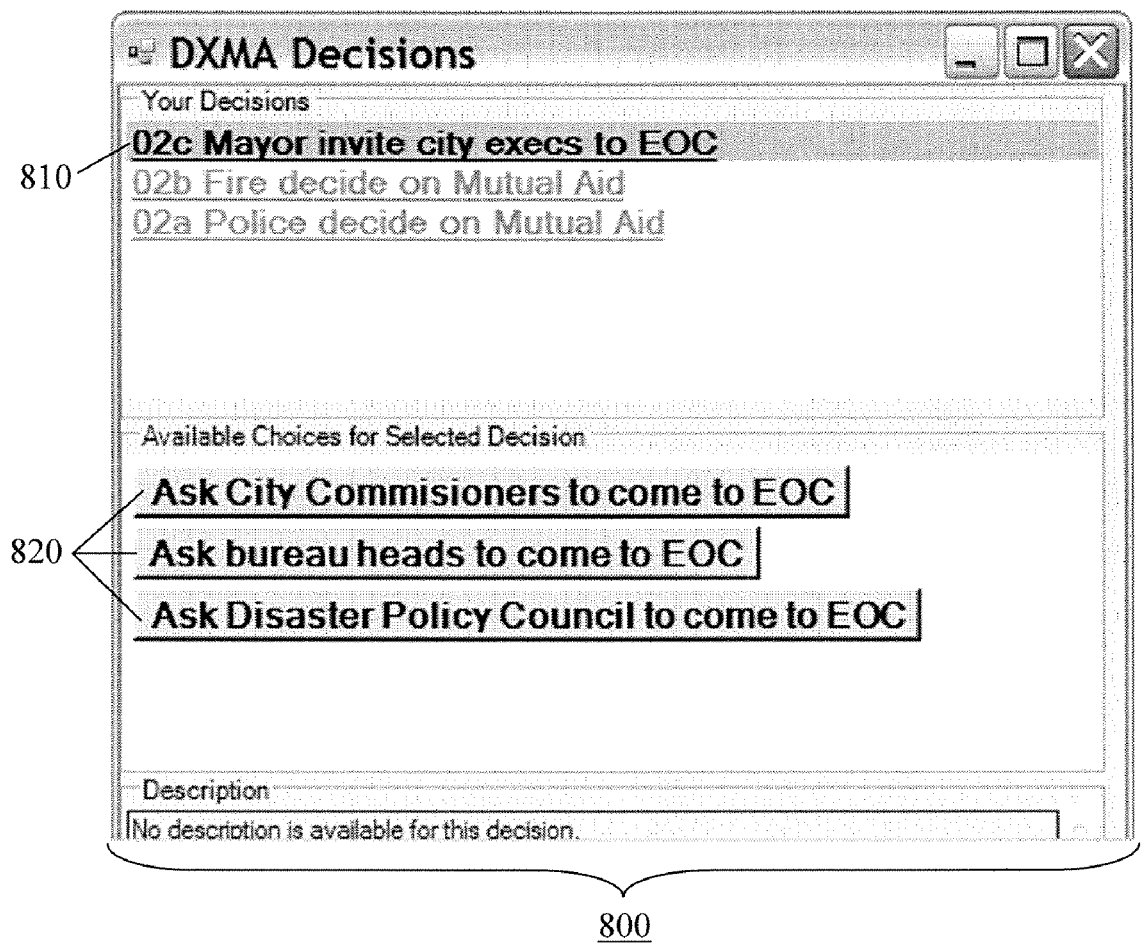
FIG. 8 is an illustration of a client decision window according to an embodiment of the present invention.

FIG. 8 is an illustration of a client decision window according to an embodiment of the present invention. Decision window 800 displays decisions 810 and possible choices 820 associated with a selected decision to users of the simulation. Decision window 800 gives users the ability to view all pending decisions available to that user by simply clicking on a decision title. Note that for a given decision, the user may be allowed to select a single choice, multiple choices, or no choice at all.

Figure 9:
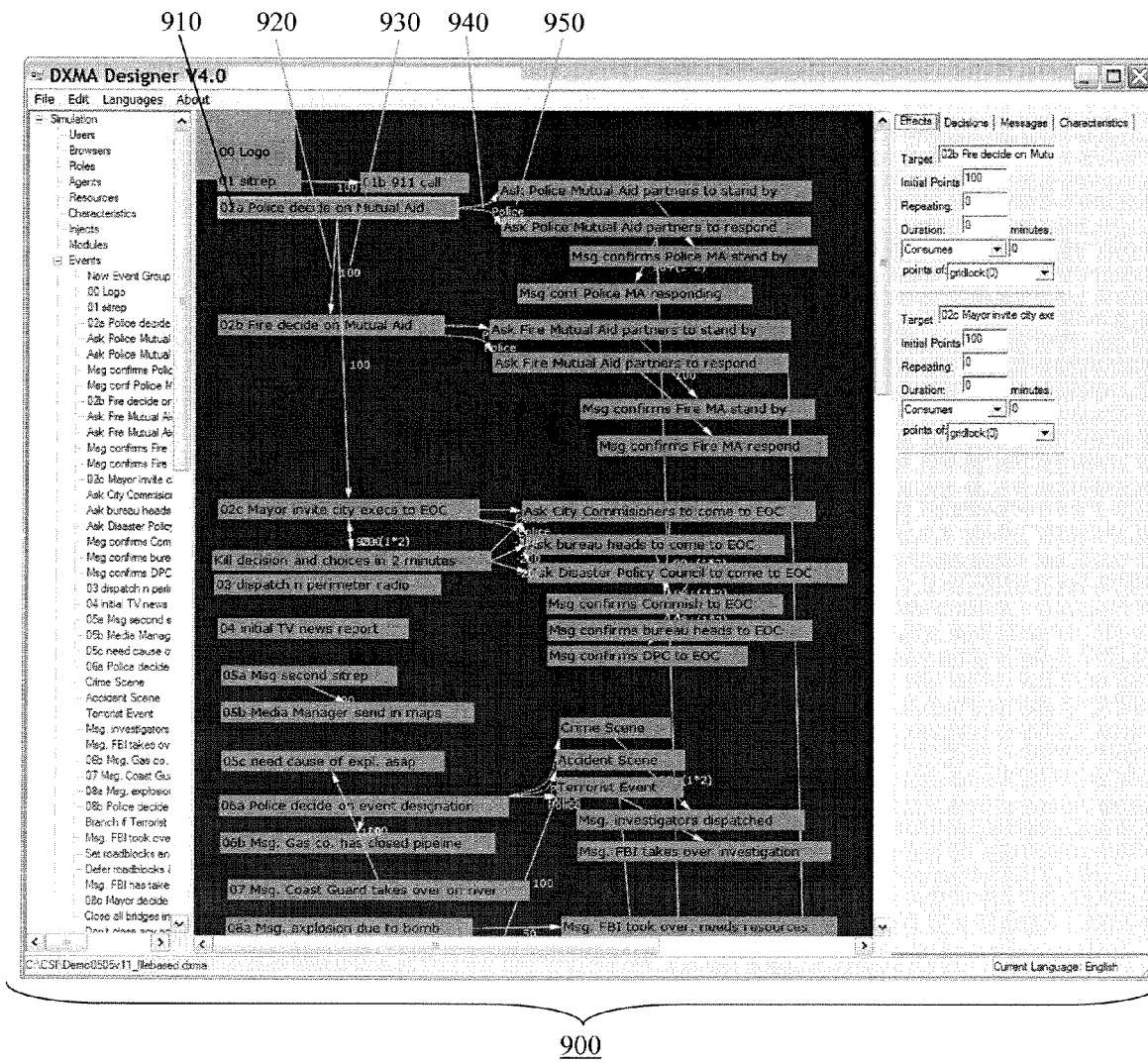
FIG. 9 is an illustration of a Designer window according to an embodiment of the present invention.

FIG. 9 is an illustration of a Designer window according to an embodiment of the present invention. In general, "Designer" refers to software used to design simulations according to some embodiments of the present invention. Designer window 900 allows a simulation designer (i.e., consultant) to visually design a simulation using graphical icons and arrows. Each box (e.g., 910) represents an event in the simulation. Solid arrows (e.g., 920) between event boxes represent that points are transferred from the originating event to the target event. Thus, solid arrows represent effects. Each solid arrow is accompanied by a mathematical term that represents points. Such terms may simply be numbers (e.g., the number "100," designed by the label 930 in FIG. 9), which signify that that quantity of points are transferred from the originating event to the target event upon activation of the originating event. Such terms may also represent that a quantity of points are initially sent and that a subsequent quantity of points is periodically sent for so many periods. For example, the term "25+10*2" represents that 25 points are sent to the target event when the originating event is first activated, and that 10 points are sent for each of the next two ("2") periods. Such periods are typically but not necessarily measured in simulation minutes. Note that a "simulation minute" may be shorter or longer than an actual minute, depending on the speed at which the simulation is run.

Dotted lines between event boxes represent decisions. Thus, for example, dotted arrows 940 represent choices available for the decision associated with the originating event 910. Each dotted arrow is accompanied by a role title (e.g., 950), which signifies the role that is faced with the decision. In the case of dotted arrows 940, the role "police" is assigned with making the associated decision.

Certain embodiments of the present invention may include a Designer feature that simplifies designing simulations by allowing any portion of a design to be grouped, the group named, collapsed (reducing on-screen detail), and moved. Such a group may be copied and pasted to other portions of a simulation. This feature allows for high efficiency in terms of time required to design a simulation and ensured consistency in parallel sections of a simulation. Further, this feature allows for creating debugged libraries of partial simulations that can be linked together.

Other Designer features include color-coding and line styles (including hiding and revealing lines) to provide the design consultant with the visual cues he or she needs to organize the many aspects of a complex simulation. Thus, a consultant may choose subsets of effect or decision lines to hide or display, and may color-code such subsets. Still other features include the ability to zoom the view in or out. Yet other features allow a consultant to highlight any given path chosen by a simulation participant or other person through the simulation in a Designer view. This may help participants understand what they did and why they got the reported outcome.

Certain embodiments of the present invention include wizards that guide the consultant through the process for creating common patterns of events and decisions. For example, such a wizard may include the ability to instantly generate something that requires multiple roles to be in consensus, which means an event fires only if the selected roles all make specific choices available to them. This capability can reduce the time required to construct a simulation, increase the simulation's reliability, and simplify training of consultants.

Certain embodiments of the present invention may include an automated editing/auditing/debugging assistant for the consultant. Such a feature ensures that the simulation follows certain rules, which are specified by the consultant. For instance, for an appropriately-specified rule, this feature might issue a warning if a choice has no possible impact on the simulation or no connection to any event. It may include a rule-based system that will allow the consultant to test the simulation design more thoroughly than a human could, thereby increasing reliability, spotting bugs, and reducing the time required to create and validate a simulation.

Figure 10:
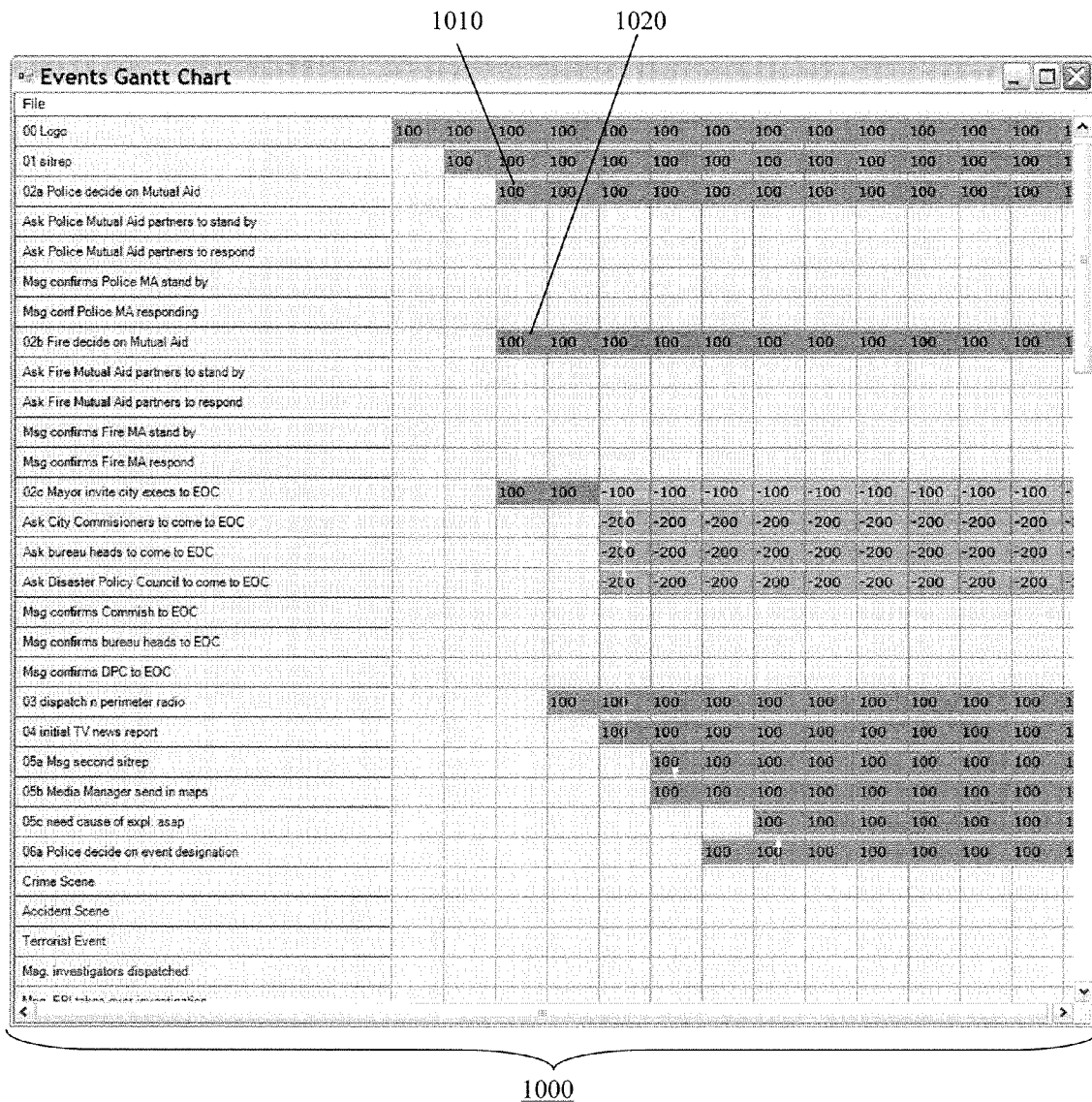
FIG. 10 is an illustration of a Gantt window according to an embodiment of the present invention.

FIG. 10 is an illustration of a Gantt window according to an embodiment of the present invention. Window 1000 may be used for debugging or for viewing paths through the simulation. Window 1000 schematically summarize when events trigger other events. For example, in window 1000, event 1010 sends 100 points to event 1020 at the time increment corresponding to the horizontal position of event 1010. Window 1000 may be specialized to provide a view of the actual path chosen by the simulation participants.

Figure 11:
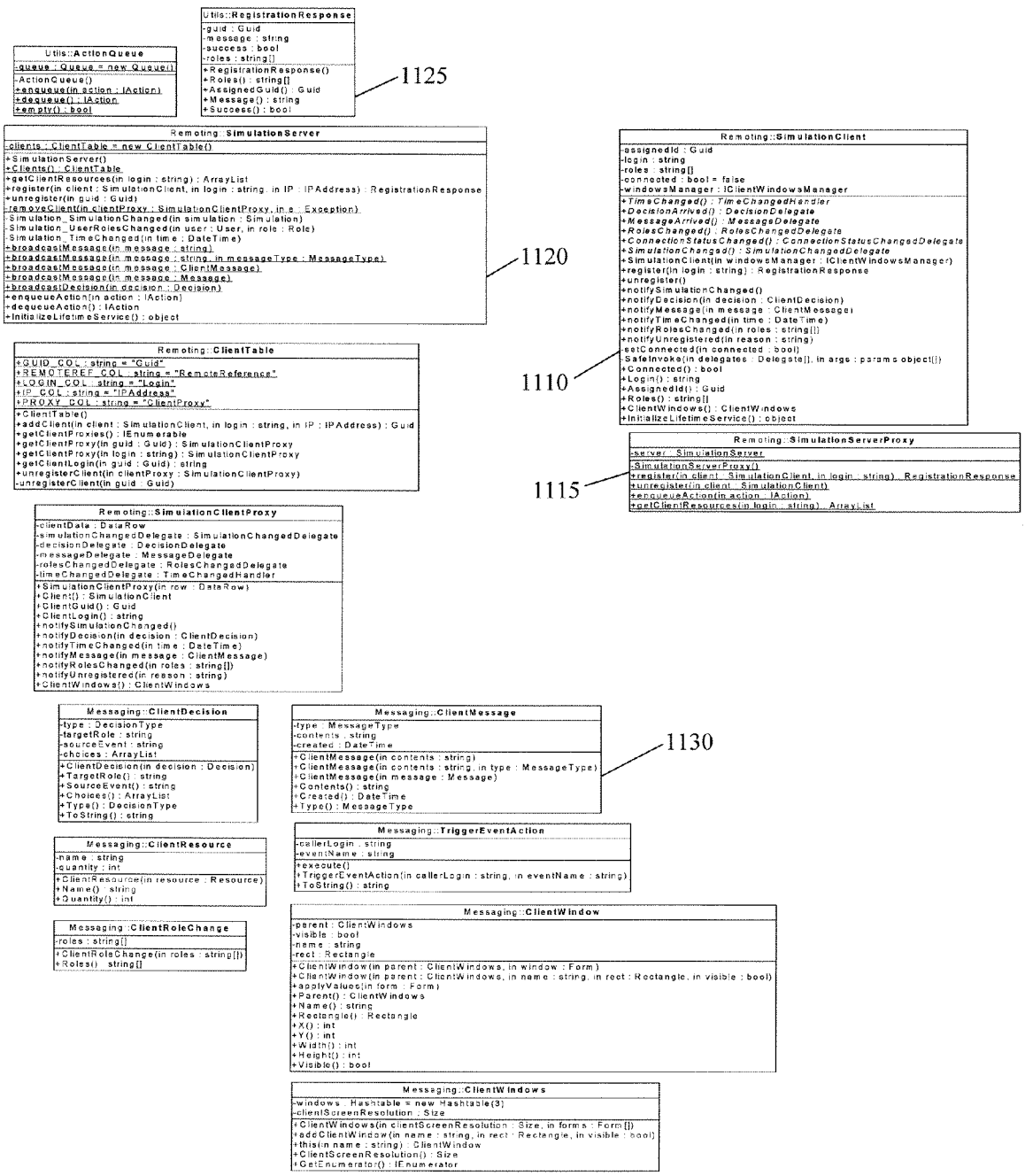
FIG. 11 is a schematic diagram of networking client/server messaging according to an embodiment of the present invention.

FIG. 11 is a schematic diagram of networking client/server messaging according to an embodiment of the present invention. In operation, SimulationClient 1110 makes a call to the simulation server through SimulationServerProxy.register( ) 1115, passing in a login and a remote reference to itself. On a successful login, SimulationServer 1120 will wrap the SimulationClient 1110 in a SimulationClientProxy 1115 convenience class instance, associate it with a Guid for easy identification, store it in the ClientTable 1125 and use it subsequently to communicate back to the client. The server will then return a RegistrationResponse 1125 instance containing the Guid, the initial roles assigned to the user the client has logged in as, and a success flag. On a failed login, RegistrationResponse's 1125 success flag will be set to false and the message parameter will have an explanation of why the registration failed, such as "login not found." The Messaging::XXX 1130 namespace contains classes used for network communications. These classes are designed for quick and easy serialization across the network and so are often simplified, stripped down versions of Simulation entities.

Figure 12:
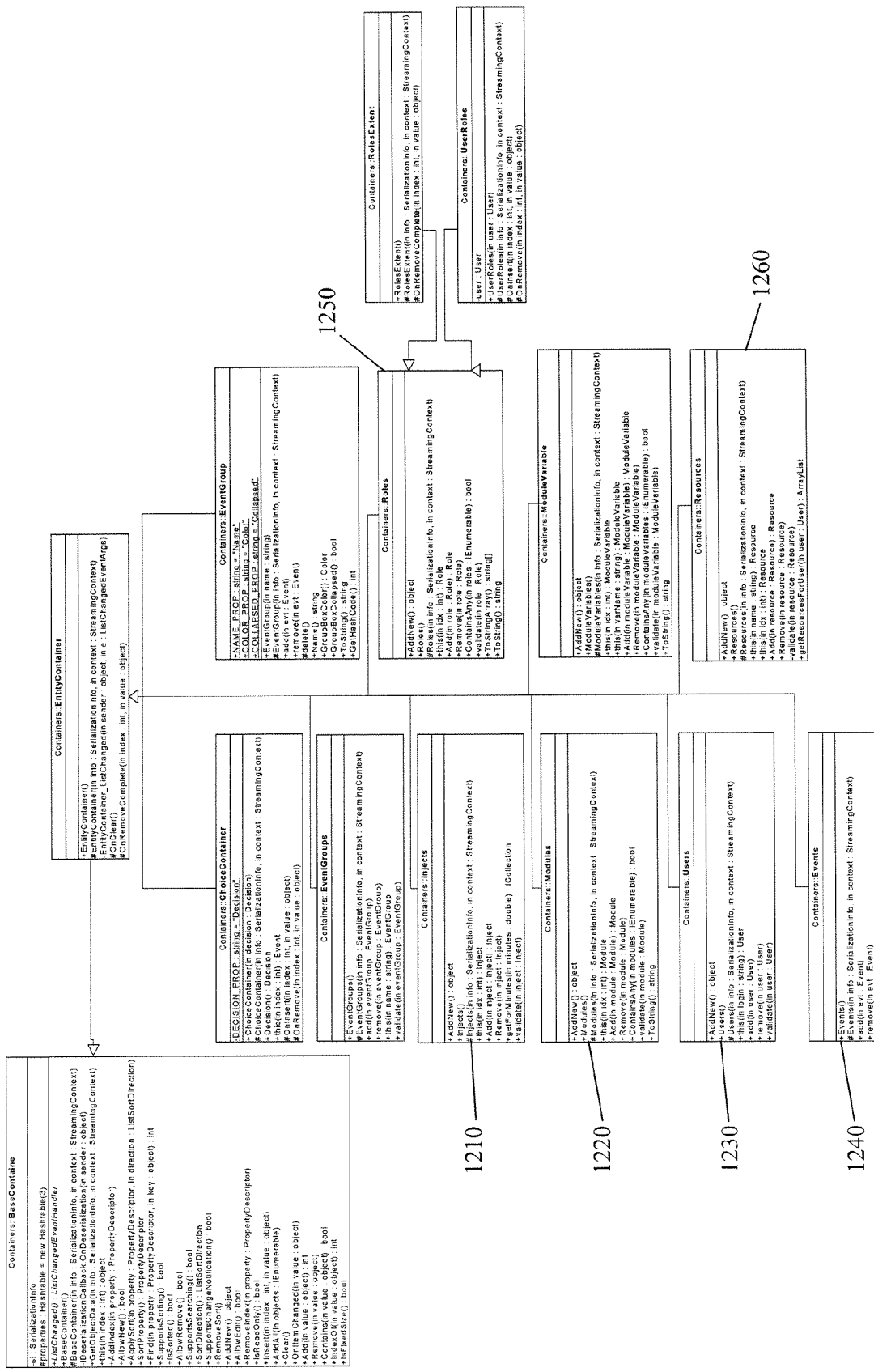
FIG. 12 is a schematic diagram of various entity containers according to an embodiment of the present invention.

FIG. 12 is a schematic diagram of various entity containers according to an embodiment of the present invention. In particular, FIG. 12 depicts injects 1210, modules 1220, users 1230, events 1240, roles 1250 and resources 1260.

Figure 13:
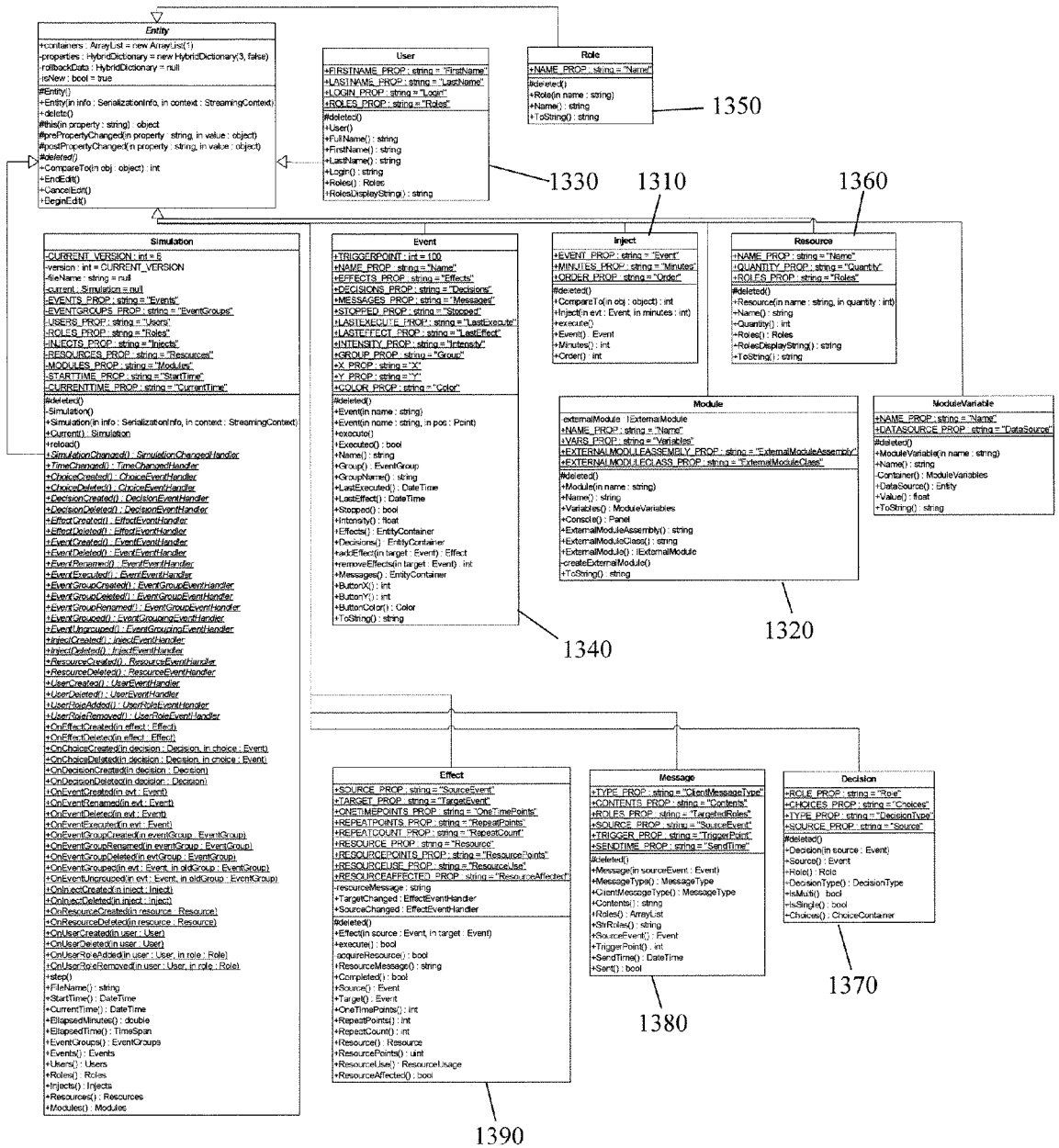
FIG. 13 is a schematic diagram of core entities and data structures according to an embodiment of the present invention.

FIG. 13 is a schematic diagram of core entities and data structures according to an embodiment of the present invention. In particular, FIG. 13 depicts injects 1310, modules 1320, users 1330, events 1340, roles 1350, resources 1360, decisions 1370, messages 1380 and effects 1390.

Figure 14:
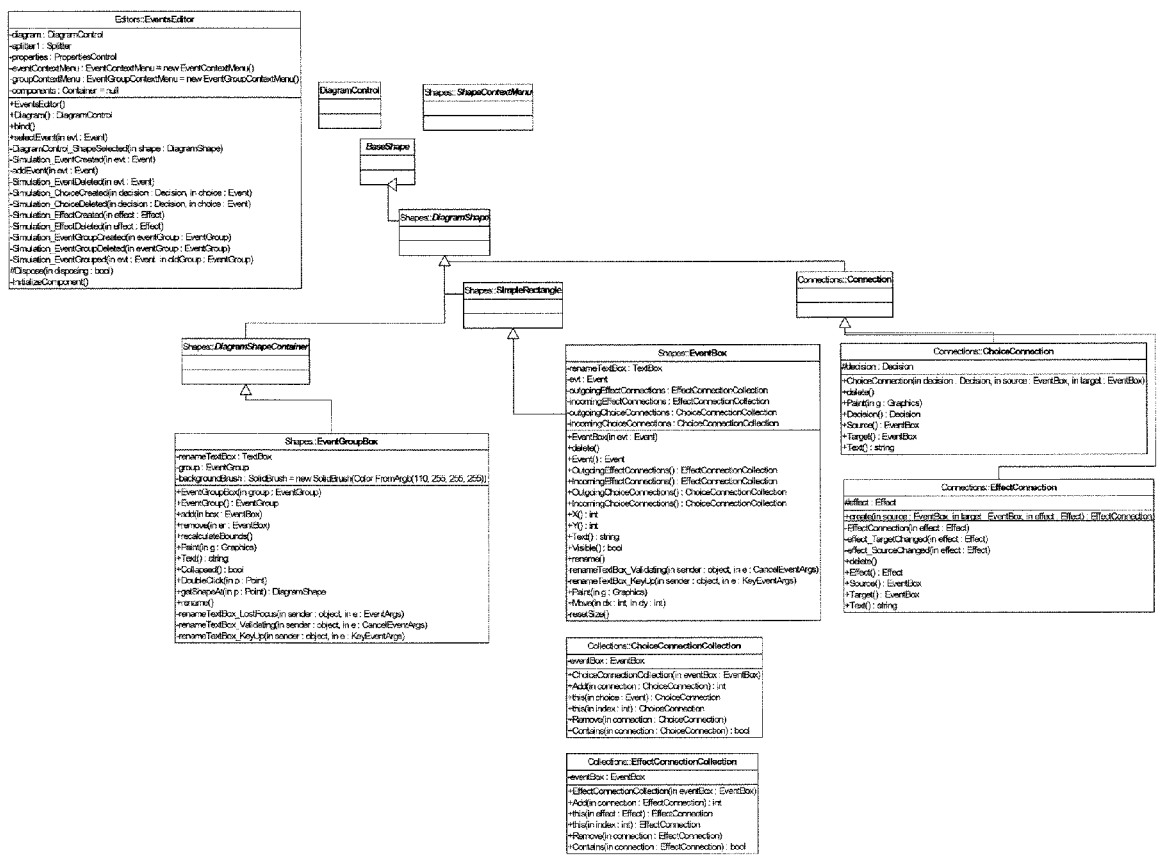
FIG. 14 is a schematic diagram of a diagramming system according to an embodiment of the present invention.

FIG. 14 is a schematic diagram of a diagramming system according to an embodiment of the present invention. A standard graphing library may be implemented. The core object in the simulation, called "Simulation" publishes object addition/removal events. The graphing library contains objects that visually represent events and effects. So, for example, when an event UI object is deleted in the graph, that object calls the real event object and deletes it. That deletion will fire an event deletion event which the main graph canvas listens for, and which will cause it to remove the relevant UI object (s).

Figure 15:
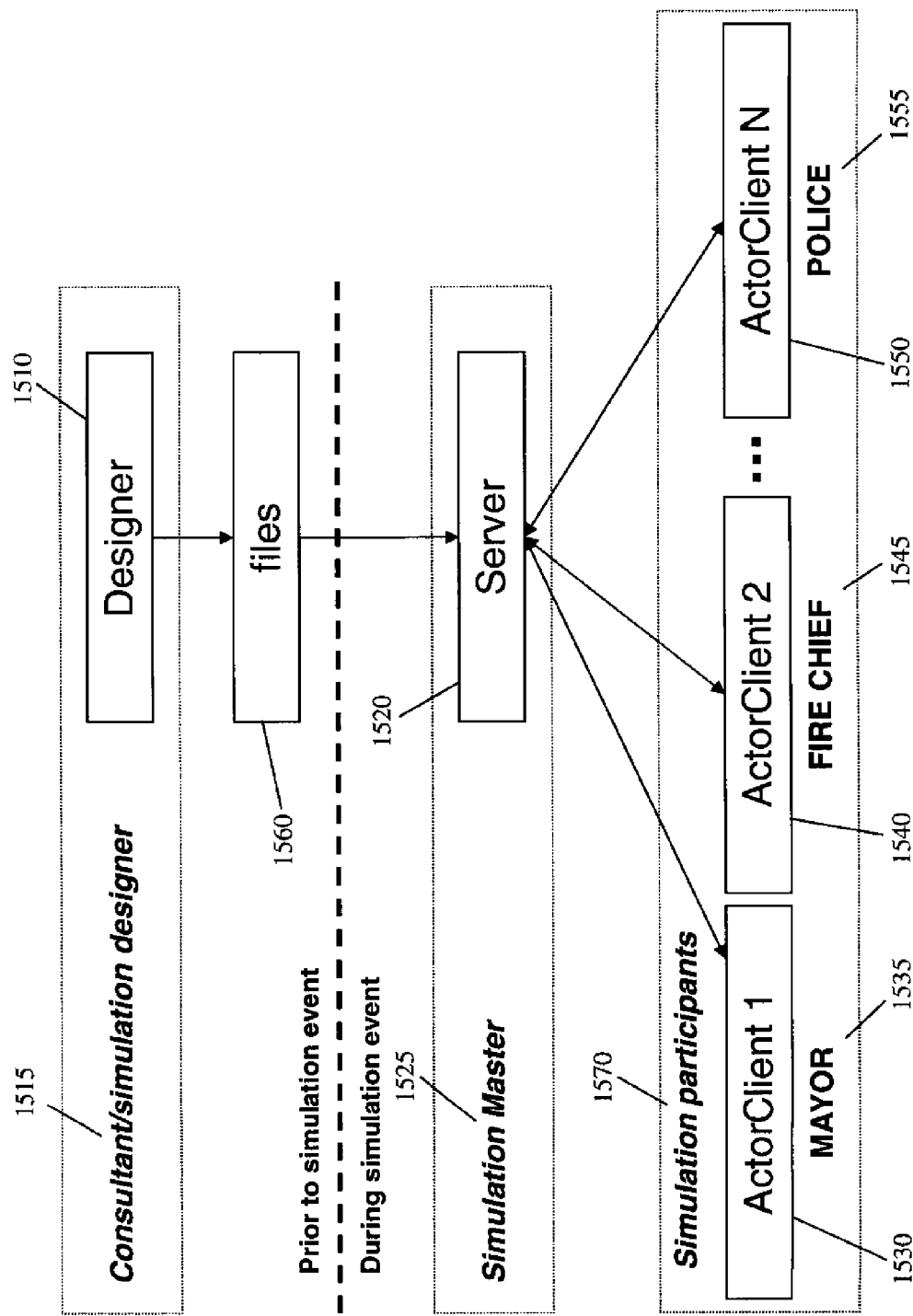
FIG. 15 is a schematic diagram of an architecture overview according to an embodiment of the present invention.

FIG. 15 is a schematic diagram of an architecture overview according to an embodiment of the present invention. In particular, FIG. 15 depicts relationships among Designer 1510, Server 1520, and ActorClients 1530, 1540, 1550. According to this embodiment, Designer 1510 is a software-based utility for creating simulations. An exemplary embodiment of Designer 1510 is discussed above in reference to FIG. 9. Once consultant 1515 prepares a simulation in Designer 1510, Designer 1510 outputs files 1560 representing the simulation. That is, files 1560 contain all information needed for Server 1520 to run an associated simulation. Such files may be conveyed to Server 1520 on storage media or transferred electronically, e.g., over the internet, an intranet, a local area network ("LAN"), a wide area network ("WAN") or a wireless network. To actually run a simulation, simulation master 1525 controls Server 1520 to execute a simulation based on files 1560. Simulation master 1525 is generally a technician hired to execute simulations and attend to any real-world run-time requirements, such as providing walkie talkies or other communication gear to the simulation participants. Server 1520 is linked electronically to each simulation ActorClient 1530, 1540, 1550. Such linkage may be by way of, e.g., an intranet, the internet, a wireless network, a LAN, or a WAN. Other linkages are also possible. In this embodiment, each ActorClient 1530, 1540, 1550 is a computer-implemented process that allows human being or agent (discussed further below) simulation participants 1570 to assume roles in the simulation. In the embodiment of FIG. 15, ActorClient 1530 is associated with the role of mayor 1535, ActorClient 1540 is associated with the role fire chief 1545, and ActorClient 1550 is associated with the role police chief 1555. Note that, in general, ActorClients 1530, 1540, 1550 are completely flexible and can be associated with any role. In other words, a consultant may create and define the roles of ActorClients 1530, 1540, 1550 as desired.

Figure 16:
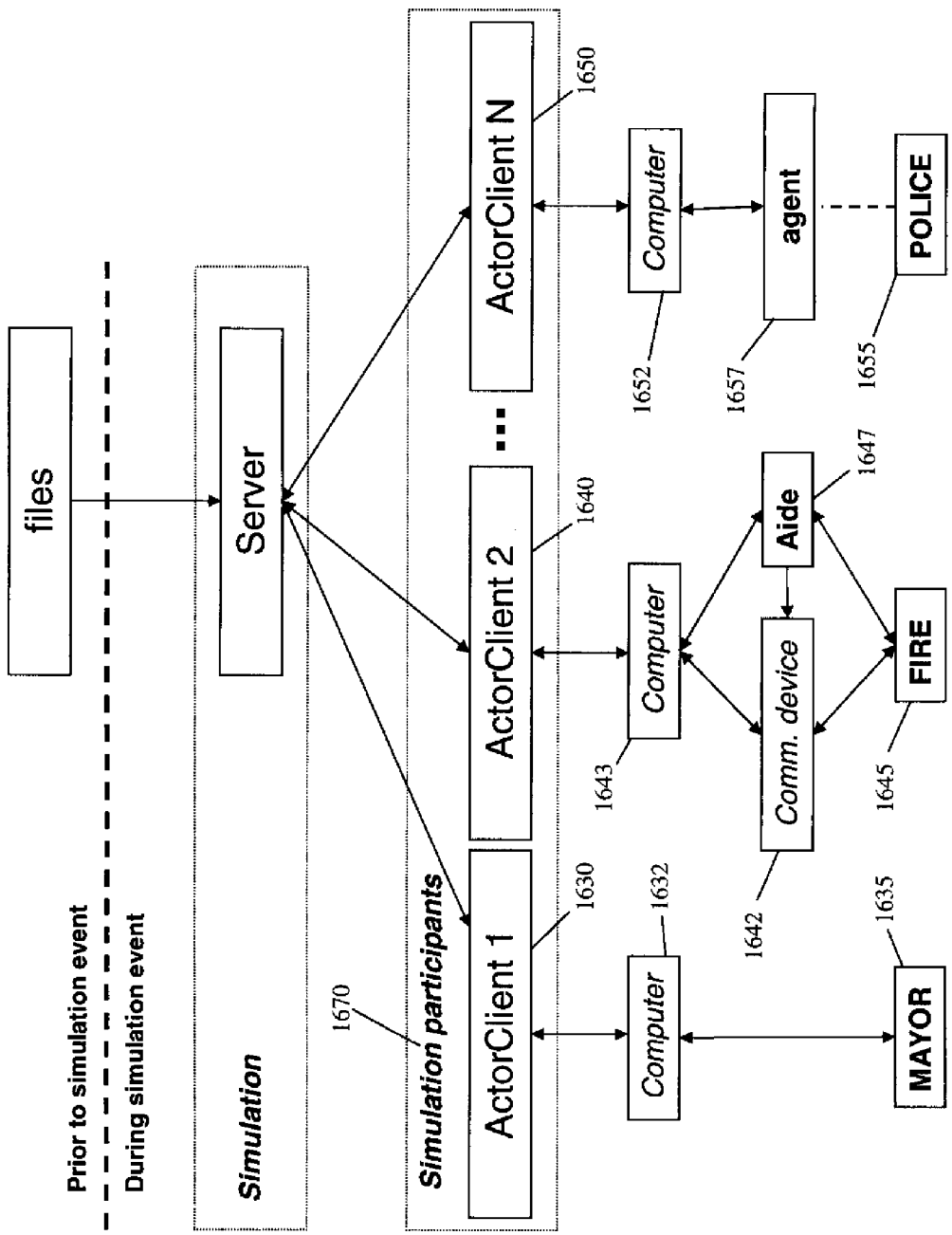
FIG. 16 is a schematic diagram of exemplary communication amongst various roles according to an embodiment of the present invention.

FIG. 16 is a schematic diagram of exemplary communication amongst various roles according to an embodiment of the present invention. In particular, FIG. 16 depicts various ways that participants 1670 can communicate in a simulation. Participants 1670 may be human beings or agents (discussed in detail below). ActorClient 1630 is associated with the role of mayor 1635. The human being user that controls the mayor 1630 role interacts with the simulation via a computer 1632. Computer 1632 may be a standard computer linked to the simulation via, for example, internet, intranet, WAN, LAN, or wireless network.

ActorClient 1640 is associated with the role of fire chief 1645. The person controlling the fire chief 1645 role may be physically removed from his or her computer 1643. Instead, the fire chief 1645 role receives messages and other information via one or both of communication device 1642 and aide 1647. Communication device 1642 may be, by way of non-limiting example, a pager, PDA, cell or land-line phone or walkie talkie. Communication device 1642 is connected to the simulation using, again by way of non-limiting example, a module in contact with computer 1643. Aide 1647 may be a human being or agent (the latter possibly using voice simulation and recognition technology) in communication with the simulation and with the person associated with fire chief 1645. Aide 1647 may communicate with the simulation using, by way of non-limiting example, computer 1643, a pager, PDA, cell or land-line phone, a walkie talkie, an internet connection, or a VoIP connection. Aide 1647 may communicate with fire chief 1645 using communication device 1642. Note that the person associated with fire chief 1645 may be located anywhere in the world.

The role of police chief 1655 is not associated with a human being in this embodiment. Instead, the simulation may simply proceed without any input from the role of police chief 1655. That is, police chief 1655 would be part of the simulation, in the sense that the simulation was calibrated with a police-chief role, but would make no decisions. In general, simulations according to embodiments of the invention do not require that decisions get made. Instead, the simulation would proceed with or without police chief 1655 decisions, as in a real-life situation in which a police chief is absent or incommunicado. In other embodiments, the role of police chief 1655 may be controlled by agent 1657 implemented on computer 1652.

In general, agents are computer-operated participants in a simulation. Each role may be assigned to either a human or an agent at run time or at any other time. Thus, a simulation may have different combinations of agents and human participants each time it is run. Agents may make decisions randomly, yet weighted by agent characteristics as discussed below. Agents' characteristics can be easily changed, which causes their decision-making behavior to change. Therefore, changing one or more agents' characteristics in a given simulation may lead to different outcomes each time the simulation is run. A simulation that runs with only one human participant can run as an individual training simulation where the human goes through the simulation with other roles being handled by agents.

Agents may have characteristics, such as by way of non-limiting example, aggressiveness, boldness, impatience, consensus-seeking, and quick-responsiveness. Such characteristics can be quantified using a fixed scale (e.g., 1 to 10). The simulation designer may specify and provide values for such characteristics. When agents (as opposed to humans) operate roles in a simulation, embodiments of the present invention may use rules in association with the agent characteristics to determine the choices that agent will make. For example, an "impatient" agent (i.e., an agent with a high impatience score) may select a choice quickly, whereas a "wait-and-see agent" (i.e., an agent with a low impatience score) may take longer to make a decision.

An agent with a high consensus-seeking score will frequently ask other roles, (played by agents, humans, or a combination thereof) for advice, whereupon the agent will weigh the advice to make its own decision. Such an agent may be designed to seek consensus from specific roles; that is, it need not ask all roles for advice. Also, such an agent may wait a specified time period (which may vary, depending on the decision) to get advice before making its decision. Thus, for example, a slow-to-respond agent or human may end up having no impact on the decision made by an agent with a high consensus-seeking score.

Embodiments of the present invention that include agents may further assign, for each decision, a value to each choice and agent characteristic pair. That is, for a given decision, each choice may be assigned a score (e.g., 1 to 10) for each agent characteristic, such as aggressiveness, boldness, impatience, consensus-seeking, quick-responsiveness. For example, the choice "ignore" 364 of FIG. 3 would typically be assigned a low boldness score, whereas a choice of "personally drive to disaster scene" would typically be assigned a high boldness score. An agent with a high boldness score would probably choose "personally drive to disaster scene" over "ignore" due to the boldness scores associated with these choices.

Figure 17:
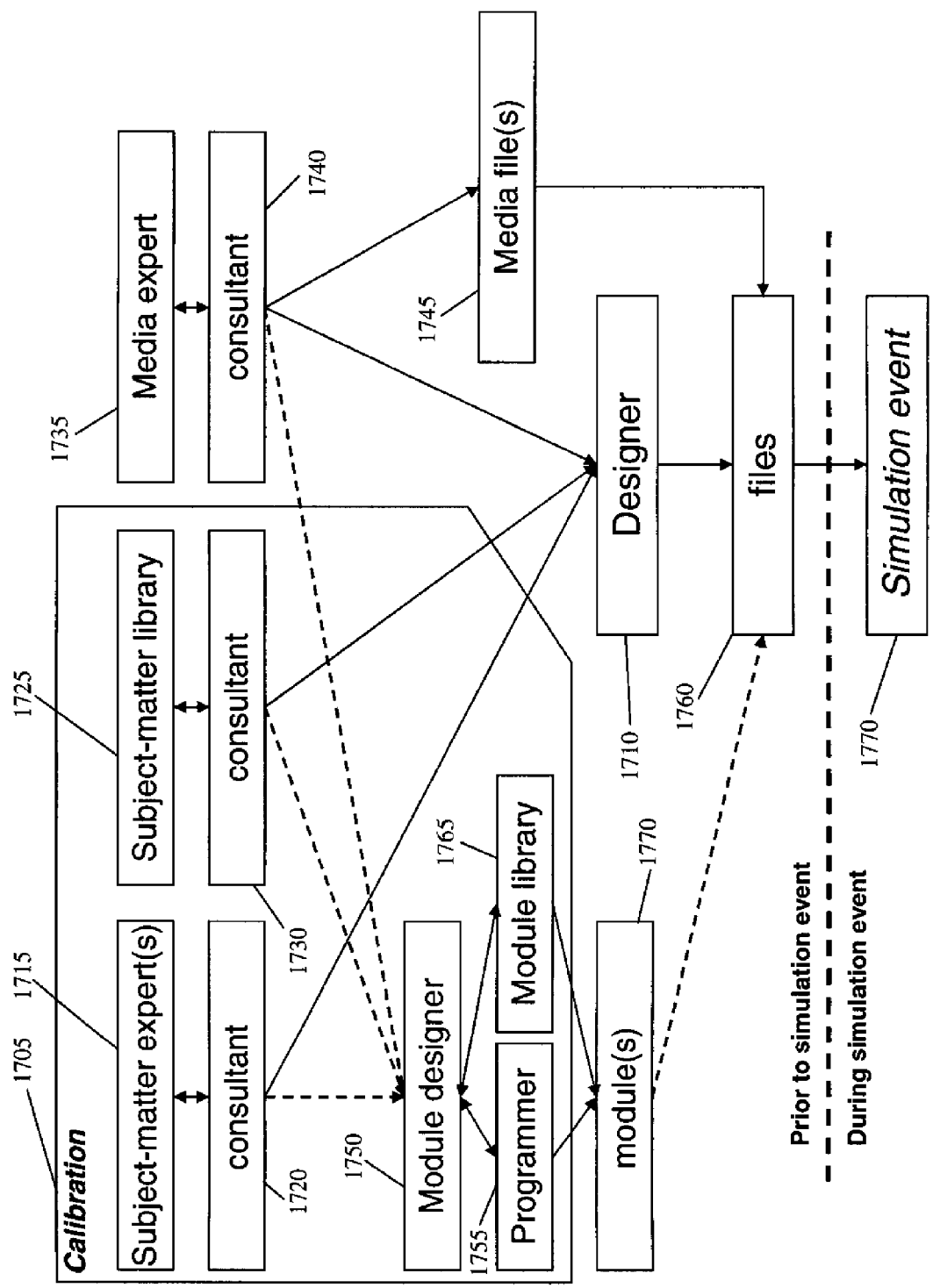
FIG. 17 is a schematic diagram of simulation design and calibration according to an embodiment of the present invention.

FIG. 17 is a schematic diagram of simulation design and calibration according to an embodiment of the present invention. In particular, diagram of FIG. 17 depicts possible sources of data, decisions, modules and other simulation components. As part of calibration 1705, consultants 1720, 1730 work with subject-matter experts 1715 and subject-matter libraries 1725, respectively, toward producing modules 1770 and creating simulations using Designer 1710. Thus, consultant 1730 works with subject-matter library 1725, which contains one or more saved simulations (or parts of simulations). By way of non-limiting example, subject-matter library 1725 may contain a role for the Federal Emergency Management Agency chief. Consultant 1730 may copy and paste such a role into simulations under design. Thus, consultant 1730 provides information to be used in simulations created using Designer 1710. Consultant 1720 interviews subject-matter experts 1715 and translates their knowledge into simulations via Designer 1710. Consultant 1720 also provides information to module designer 1750.

Module designer 1750 works with programmer 1755 and library 1765 of previously coded modules to design and produce modules 1770, which are incorporated into simulation files 1760 to be used in a simulation event 1770. Module designer 1750 receives information from consultants 1720, 1730, 1740 as needed. Programmer 1755 and module designer 1750 add to and draw from library 1765 of previously coded modules. Module library 1765 may comprise, for example, Dynamic Link Libraries ("DLL") that provide custom functionality. Such functionality may include outcome calculations including, by way of non-limiting example, economic consequences and casualties. Modules 1770 are incorporated into files 1760 such that they are incorporated into the simulation 1770 under design.

Media experts 1735 work with consultant 1740 to create media files 1745 for simulations. Consultant 1740 thereby contributes to the design of the simulation 1770 using Designer 1710. Presentation of the media contained in media files 1745 may be delivered through any, or a combination, of video, audio, and paper. Other communication channels are also possible. Media files 1745 are included in files 1760, which define the simulation 1770 under design.

Note that in some embodiments of the present invention, multiple paths may lead to the same event. In general, a given simulation may be complex enough to incorporate many different routes to a given simulation feature. The logical decision pathways associated with such embodiments do not take the form of a tree, as there may be multiple pathways to the same node. However, tree-structured decision pathways are also contemplated. Certain instances (e.g., events) in a simulation may only be activated by multiple prior interactions (e.g., decisions, timing, resource allocations, etc.) that occurred in particular ways. That is, a confluence of events might be required in order to get to a particular simulation feature.

Certain embodiments of the present invention may analyze the behavior of human participants in order to calculate characteristic values for those humans. Such characteristics include those used to characterize agents, including, by way of non-limiting example, aggressiveness, boldness, impatience, consensus-seeking, and quick-responsiveness. Embodiment of the invention may evaluate the entire set of interactions made by a human simulation participant and determine values of each characteristic for that human. Thus, the human participant's choices are analyzed to decide whether and to what degree they were fast to decide, their choices were bold, they sought advice from other participants, etc. Such embodiments may generate full reports of a human participant using analysis from one or more simulations in which that human participated.

Certain embodiments of the present invention allow for agent-only simulations. Such a simulation can be run repeatedly (e.g., thousands of times) to explore different outcomes resulting from different paths through the simulation. Note that agents' semi-random behavior contributes to the diversity of results upon multiple runs through such simulations. Such simulations thus operate as research tools or as a policy-analysis tools by generating a spectrum of possible outcomes. Injects can be used to simulate different investments or other policy decisions, and so a multiple-simulation analysis can help demonstrate whether an investment or policy decision is a good idea. For example, an inject could simulate a decision to add firefighters, which would increase the firefighter resource prior to the crisis.

Certain embodiments of the present invention may analyze the spectrum of possibilities and outcomes for a given simulation. In such embodiments, databases reflecting many simulation run-throughs may be generated and analyzed to determine the possible range of outcomes. Such databases may include many details, such as recordations of and timestamps for each participant (e.g., agent) action (e.g., decision). Generating such databases may include running many agent-only simulations using, by way of non-limiting example, Monte Carlo techniques. For some simulations, such databases may be generated by way of exhaustive run-throughs, that is, by running the simulation for every possible combination of choices and actions of the participants. In alternate embodiments, such databases may include both agent-only and human-participant simulations. In still other embodiments, such databases may include human-only simulations. Databases may be mined for, for example, typical, optimal, or worst-case routes through the simulation.

Outcomes generated by a specific simulation run-through involving human participants can be compared to those that could have been achieved as represented by such a database in order to yield a performance score for the human participants. More generally, such databases can allow researchers to determine what characteristic scores (e.g., fast versus slow decisions, etc.), decisions, and decision combinations lead to good or bad outcomes. Further, such databases can be analyzed to determine contingency plans. For example, such analysis may be used to generate advice of the form: if the participant finds that certain events occur, then that participant should take path A; if different events occur, the participant should take path B.

Embodiments of the present invention may include process abstractions. A process is something ongoing, such as a factory that continuously consumes resources and produces goods. Processes can be turned on or off, and the rates of using inputs and generating outputs can be changed. One type of process may be generated by modifying an effect such that it lasts in perpetuity (i.e., the duration of the simulation).

Embodiments of the present invention may be used to simulate a wide variety of situations. By way of non-limiting example, the following situations may be simulated: public sector situations, private sector situations, situations that span both public and private sectors, crises, product recalls, executive kidnappings, natural disasters such as earthquakes and hurricanes, entry of competitors into a market, product failure emergencies, industrial accidents, and terrorist attacks.

Embodiments of the present invention may support multiple languages. In such embodiments, the simulation may present messages, decisions, choices and other communications and presentations in any selected language. The language for any given participant may be selectively and individually changed at any given time. Such embodiments may include translation engines and language repositories in order to instantly effect the translation, or may rely on third-party translator logic. Any number of languages may be supported, including, but not limited to: English, Spanish, Portuguese, Mandarin, French, Russian, Hawaiian, Hindi, Hebrew, Arabic, Bengali, Malay, Indonesian, Japanese, German, Farsi, Urdu, Punjabi, Vietnamese, Tamil, Wu, Javanese, Turkish, Telugu, Korean, Marathi, Italian, Thai, Cantonese, Gujarati, Polish, Tagalog, Kannada, and Burmese.

Embodiments of the present invention may be used to easily generate a variety of simulations by simply altering a given simulation. For example, by changing messages and other information shown to participants, and without changing the underlying structure of the simulation, a custom-made simulation can be genericized. Such a genericized simulation may be used, without further modification, for training workshops, or may be modified to generate additional simulations. A given simulation may have its communications translated into a different language to generate additional simulations, which may be set in different locations from the given simulation. This provides the ability to compare databases of decisions and outcomes from country to country using essentially the same simulation, differing only in the language used to communicate with participants.

In certain embodiments of the present invention, choosing the correct strategy may require specialized knowledge, as decisions can simultaneously affect features such as, by way of non-limiting example, telecommunication, transportation and medical systems. An example is a decision to close a number of bridges, which could prevent ambulances for getting to their destination and repair crews from fixing telecommunication breakdowns. These occurrences may cause major transportation gridlock, which in turn could cause a tremendous rise in telecommunications traffic as commuters increase use of their cell phones.

Embodiments of the present invention may separate the task of calibration (done by a trained consultant) and execution (done by trained technicians). Separating calibration from execution also allows for secure delivery of the simulation. The simulation can be set so as to be modifiable only by using calibration software (e.g., Designer).

In certain embodiments of the present invention, knowledge from domain experts is captured in the authoring tool in the form of a network of events connected by their effects on each other and constrained by available resources. Expert contributions are often limited to a single "silo" of information, such as police operations. A part of the work in creating a decision model is the connection of the different silos to uncover causal relationships. For example, a bridge closure may have wide ranging effects over the abilities of various agencies to perform their duty. A company layoff may save costs but be expensive in the long run as skilled labor is replaced by less skilled workers.

Using a computer system to coordinate the scenario confers many advantages with respect to timing. For example, simulation timing may be precisely controlled. A simulation may run in real, slowed, or accelerated time. A simulation may be cheaply and precisely repeated for different users. Simulations may be recorded and played back. Such playback may be in real time, slowed time, or accelerated time. A simulation may be rewound so different decision paths can be tried out. Simulations may simulate past events, potential future events, or fictional events.

The use of computers to implement the simulation also confers many advantages with respect to space. For example, users may be geographically distributed. Participants may be located anywhere in the world where they have access to the internet, and need not be co-located.

Certain embodiments of the present invention include advantages with respect to training people. For example, users may get personalized simulation experience based on their roles. The number of participants is unlimited.

Simulations may be built from or incorporated with other simulations. Simulations may be precisely integrated with other simulations, such as financial outcome models, power grid simulators, traffic models, and so on. Multiple simulations may be merged to create new, more comprehensive simulations. For example, a New York simulation can be merged with a Connecticut simulation, a police simulation with a fire simulation, or 1998 simulation with a 1999 simulation.

Embodiments of the present invention allow for analysis of participants' conduct as well as analysis of the simulation itself. For example, graph-based representation of events and effects allow for the ability to algorithmically determine best/worst/fastest execution paths based on criteria such as resource consumption. Multiple simulation runs may be saved in order to research statistical behavior models, which allow spotting of problematic/typical/innovative behavior.

Embodiments of the present invention may be implemented using hardware, firmware, software, or any combination thereof. Standard computer hardware and/or software programming techniques may be used.

Other embodiments, uses, and advantages of the invention will be apparent to those skilled in the art from consideration of the specification and practice of the invention disclosed herein. The specification and drawings should be considered exemplary only, and the scope of the invention is accordingly not intended to be limited thereby.

APPENDIX

```
Main Execution Loop - run by main thread:
while (true) {
    if (Simulation speed > 0 and Simulation is Running) {
        step( );       //See below for definition
    }
    //Sleep for a simulation second (not a real world second).
    Sleep(1000/Speed);
}
The step( ) function - called by main loop for every simulated second:
//Set the time if we're starting.
if (first call to step( )) {
    CurrentTime = DateTime.Now;
} else {
    CurrentTime = CurrentTime.AddSeconds(1);
}
//On minute intervals, execute the simulation logic:
if (CurrentTime.Second == StartTime.Second) {
    //First. execute queued user actions so that previously
    //submitted requests happen first.
    for each(IAction action in UserAction queue) {
        action.execute( );                      //See below
    }
    //Execute any injects for this minute
    for each(Inject inject in Injects[EllapsedMinutes]) {
        inject.execute( );                      //See below
    }
    //Allow any event to execute
    for each(Event evt in this.Events) {
        evt.execute( );                         //See below
    }
    //Finally, update all external modules
    for each(Module module in this.Modules) {
        module.ExternalModule.execute( );       //See below
    }
}
if (TimeChanged != null) fire TimeChanged event;
The IAction execute( ) function - TriggerEventAction is the only class
which is currently relevant:
Event e = my target event;
//If event is already active:
if (e.Intensity >= Event.TRIGGERPOINT)
    fail("Event is already active");
//If event intensity is < 0, it is considered disabled:
if (e.Intensity < 0) {
    fail("Event intensity is below 0. Event is disabled.");
}
//Ok, do it, setting the intensity to >= Event.TRIGGERPOINT
//will cause Event.execute( ) to be called. See below for the
//definition of that method.
e.Intensity = Event.TRIGGERPOINT;
The Inject.execute( ) function:
Event e = my target event;
//Set event intensity to 100 or the event's current
//intensity, whichever is greater. If the event's
//intensity was < 100 and is set to >= Event.TRIGGERPOINT,
//Event.execute( ) will be called. See below for the
//definition of that method.
e.Intensity = Math.Max(Event.Intensity, Event.TRIGGERPOINT);
The Event.execute( ) function:
//1. Since messages can be sent at any intensity level,
//regardless of whether or not this event has been
//triggered, we go over them first:
for each(Message message in this.Messages) {
    if (!message.Sent && this.Intensity >= message.TriggerPoint) {
        //Sending message will set message.sent to true,
        //server will send the message only to clients
        //whose users have the appropriate roles.
        SimulationServer.broadcastMessage(message);
    }
}
//2. If this event has been triggered, iterate and execute
//its effects. First, make sure simulation has not already
//executed this minute:
if (LastExecuted != Simulation.CurrentTime) {
    //Call effects, which could cause a cascade that will
    //end up here again, hence LastExecuted is set now to
    //prevent stack overflows:
    if (this.Intensity >= TRIGGERPOINT) {
        //Now, if this is the first time that event is
        //executing, fire off all of its decisions:
        if (!this.Executed) {
            for each(Decision decision in this.Decisions) {
                //server will send the decision only to
                //clients whose users have the appropriate
                //roles.
                SimulationServer.broadcastDecision(decision);
            }
            fire Simulation.OnEventExecuted(this) event;
        }
        this.LastExecuted = Simulation. CurrentTime;
        for each(Effect effect in this.Effects) {
            //Effect.execute( ) will return true if the
            //effect execute, false if the effect did
            //not execute due to insufficient resources
            //or if it has already applied all of its
            //points to the target event.
            if (effect.execute( )) {          // See below
                this.LastEffect = Simulation.CurrentTime;
            }
        }
    }
}
The Effect.execute( ) function:
//Executes the effect's onetime or repeat points,
//as appropriate, updating all relevant counters.
//Returns whether or not the execution had any effect
//on any events.
//Are resources available/already consumed?
if (!acquireResource( )) return false;        // See below
//If the onetimepoints haven't been applied apply them
if (OneTimePoints != 0) {
    Target.Intensity += OneTimePoints;
    OneTimePoints = 0;
    return true;
}
//One time points applied/not present, see if there
//are any reapeating points to apply
if (RepeatCount > 0 && RepeatPoints != 0) {
    Target.Intensity += RepeatPoints;
    RepeatCount--;
    return true;
}
return false;
The Effect.acquireResource( ) function:
//Gets whether or not this efect is resource constrained. If the
//resource was avaiable and has already been consumed, will
//return true.
//resourceMessage will later be used by the system to give users
//meaningful feedback after they click on a decision button.
resourceMessage = null;
//ResourceUsage.Requires means that resource needs be available
//in sufficient quantity, but should not be consumed.
if (ResourceUse == ResourceUsage.Requires) {
    if (Resource.Quantity == 0) {
        resourceMessage =
            "Order belayed: " + this.OneTimePoints + " " +
            this.Resource.Name + " not currently available.";
        return false;
    }
    return true;
}
//Requires 0 points or resource already consumed/returned
if (ResourcePoints == 0 || this.ResourceAffected) return true;
//"Consumes" needs a certain resource quantity to be available,
//"Produces" always works:
if (
    (ResourceUse == ResourceUsage.Consumes &&
     ResourcePoints <= Resource.Quantity) ||
    (ResourceUse == ResourceUsage.Produces)) {
    //Affect the resource and update internal state
    //ResourceUse = -1|0|1:
    this.Resource.Quantity += this.ResourcePoints * ResourceUse);
    ResourceAffected = true;
    //Set up the resource message:
    //e.g. "12 more firemen now available."
    resourceMessage =
        this.ResourceUse == ResourceUsage.Produces
        ? this.ResourcePoints + " more " + this.Resource.Name
        + " now available, for a total of " +
```

APPENDIX-continued

```
        this.Resource.Quantity + ".\n"
    : "Order executed: " + this.ResourcePoints +' ' +
        this.Resource.Name + " committed towards '" + this.
        Target.Name
        + "'. " + this.Resource.Quantity +
        " remain" + (this.Resource.Quantity == 1 ? "s" : " ") +
        " available.";
    return true;
} else {
    resourceMessage =
        "Order belayed: Needed " + this.ResourcePoints + ' '
        + this.Resource.Name + " but only " +
        this.Resource.Quantity + " are available.\n";
    return false;
}
```

What is claimed is:

1. A computer-implemented system for simulating a scenario involving at least one participant, the computer-implemented system comprising:
   a role assigned to the participant;
   input means associated with the participant and with the role, the input means configured to allow the participant to select from a plurality of choices upon the role being presented with a plurality of choices;
   decision logic configured to present a decision to the role upon the decision logic being triggered, the decision comprising a plurality of choices;
   a first event configured to be activated upon accumulating a quantity of points over a first threshold;
   effect logic representing a causal relationship between the first event and a second event, the effect logic configured to be triggerable upon activation of the first event, wherein the effect logic is configured to provide at least one point to the second event upon the effect logic being triggered; and
   a second event configured to be activated upon accumulating a quantity of points over a third threshold; wherein the second event is configured to triggered the decision logic upon the second event being activated.

2. The system of claim 1 further comprising message logic configured to present a message to the role upon the message logic being triggered, wherein the second event is configured to activate the message logic upon the second event being activated.

3. The system of claim 1 wherein the effect logic is configured to, upon being triggered, periodically send at least one point to the second event.

4. The system of claim 1 further comprising inject logic configured to trigger a third event at a predetermined time subsequent to a start time of said simulating.

5. The system of claim 1 wherein the decision is presented in a format selected from the group consisting of: text, audio, and video.

6. The system of claim 1 further comprising means for starting the simulating at any point in a duration of the simulating.

7. The system of claim 1 further comprising a resource, wherein the resource has a variable quantity associated with the resource; and wherein the effect logic is configured to be triggered upon activation of the first event if the quantity associated with the resource is above a second threshold.

8. The system of claim 7 further comprising a module, the module configured to monitor the first event and the resource.

9. A computer-implemented method for simulating a scenario involving at least one participant, the computer-implemented method comprising:
   assigning a role to the participant;
   activating, using the computer, a first event upon the first event accumulating a quantity of points over a first threshold;
   allowing triggering, using the computer, upon activation of the first event, of effect logic representing a causal relationship between the first event and a second event;
   providing, using the computer, by the effect logic, at least one point to the second event upon the effect logic being triggered;
   activating, using the computer, the second event upon the second event accumulating a quantity of points over a third threshold;
   activating, using the computer, decision logic upon the second event being activated;
   presenting, using the computer, upon decision logic being triggered, a decision comprising a plurality of choices to the role; and
   selecting, by the participant, from the plurality of choices.

10. The method of claim 9 further comprising presenting a message to the role upon the second event being activated.

11. The method of claim 9 further comprising periodically sending, by the effect logic, at least one point to the second event.

12. The method of claim 9 further comprising triggering, by inject logic, a third event at a predetermined time subsequent to a start time of said simulating.

13. The method of claim 9 wherein the step of presenting comprises presenting the decision in a format selected from the group consisting of: text, audio, and video.

14. The method of claim 9 further comprising starting the simulating at any point in a duration of the simulating.

15. The method of claim 9 further comprising:
   storing in electronic memory a representation of a resource, wherein the resource has a variable quantity associated with the resource; and
   triggering, upon activation of the first event, effect logic representing a causal relationship between the first event and a second event if the quantity associated with the resource is above a second threshold.

16. The method of claim 15 further comprising monitoring, by a module, the first event and the resource.

* * * * *